(12) United States Patent
Ujikawa et al.

(10) Patent No.: US 11,811,448 B2
(45) Date of Patent: Nov. 7, 2023

(54) OPTICAL COMMUNICATION SYSTEM, OPTICAL COMMUNICATION APPARATUS AND OPTICAL COMMUNICATION METHOD

(71) Applicant: Nippon Telegraph and Telephone Corporation, Tokyo (JP)

(72) Inventors: Hirotaka Ujikawa, Musashino (JP); Shin Kaneko, Musashino (JP); Rintaro Harada, Musashino (JP); Jun Terada, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/908,416

(22) PCT Filed: Mar. 2, 2020

(86) PCT No.: PCT/JP2020/008585
§ 371 (c)(1),
(2) Date: Aug. 31, 2022

(87) PCT Pub. No.: WO2121/176490
PCT Pub. Date: Sep. 10, 2021

(65) Prior Publication Data
US 2023/0088621 A1    Mar. 23, 2023

(51) Int. Cl.
*H04B 10/03* (2013.01)
*H04J 14/02* (2006.01)

(52) U.S. Cl.
CPC .......... *H04B 10/03* (2013.01); *H04J 14/0287* (2013.01)

(58) Field of Classification Search
CPC ........... H04B 10/03–038; H04J 14/0287–0297
(Continued)

(56) References Cited

U.S. PATENT DOCUMENTS

2005/0031348 A1* 2/2005 Choi .................. H04Q 11/0067
398/59
2006/0013584 A1* 1/2006 Miyazaki ............ H04J 14/0227
398/19
(Continued)

FOREIGN PATENT DOCUMENTS

JP    2006033319    2/2006

OTHER PUBLICATIONS

Tateishi et al., "Broadband wireless transmission in railways," JR ESAT Techonical Review, 2011, 36:33-38, 13 pages (with English Translation).

*Primary Examiner* — Li Liu
(74) *Attorney, Agent, or Firm* — Fish & Richardson P.C.

(57) ABSTRACT

In an optical communication system, an optical communication device and a plurality of optical transmission devices are loop-connected via transmission line. An optical signal transmission unit of the optical communication device, when no communication interruption occurs in the transmission line, outputs an optical signal addressed to a communication destination device that communicates with the own device to a transmission line connected to either one of two neighboring optical transmission devices. The optical signal transmission unit outputs, at the time of communication interruption occurring in the transmission line, an optical signal addressed to the communication destination device to both of transmission lines connected to respective two neighboring optical transmission devices. A branch unit of the optical transmission device branches the optical signal input from a neighboring device, and outputs branched optical signals to another neighboring device and a subordinate communication destination device of the own device.

8 Claims, 8 Drawing Sheets

(58) Field of Classification Search
USPC .......................................................... 398/1–8
See application file for complete search history.

(56) References Cited

U.S. PATENT DOCUMENTS

2009/0092389 A1* 4/2009 Wei ..................... H04J 14/0204
 398/59
2013/0071104 A1* 3/2013 Nakashima ......... H04J 14/0204
 398/3

* cited by examiner

OPTICAL COMMUNICATION SYSTEM, OPTICAL COMMUNICATION APPARATUS AND OPTICAL COMMUNICATION METHOD

CROSS-REFERENCE TO RELATED APPLICATIONS

This application is a National Stage application under 35 U.S.C. § 371 of International Application No. PCT/JP2020/008585, having an International Filing Date of Mar. 2, 2020.

The disclosure of the prior application is considered part of the disclosure of this application, and is incorporated by reference in its entirety into this application.

TECHNICAL FIELD

The present invention relates to an optical communication system, an optical communication device, and an optical communication method.

BACKGROUND ART

Optical communication systems are used for relaying various traffic such as broadband radios and FTTH (Fiber to the home) (see Non-Patent Literature 1, for example). FIG. 8 is a diagram illustrating an exemplary configuration of an optical communication system. An optical communication system 900 illustrated in FIG. 8 is PON (Passive Optical Network). The optical communication system 900 has an optical line terminal (OLT) 910, optical multiplex/demultiplex units 920, and optical network units (ONUs) 930. The optical line terminal 910 is connected to N (N is an integer not less than 1) optical network units 930 via optical fibers and the optical multiplex/demultiplex units 920. The optical fibers are a trunk line fiber 940 and a branch line fiber 950.

The trunk line fiber 940 is provided with N optical multiplex/demultiplex units 920. The optical multiplex/demultiplex unit 920 is connected to one-superior trunk line fiber 940, the branch line fiber 950, and one-subordinate trunk line fiber 940. One or more optical network units 930 are connected to the branch line fiber 950.

In FIG. 8, the N optical multiplex/demultiplex units 920 are described as optical multiplex/demultiplex units 920-1 to 920-N in order from top to bottom, and a superior trunk line fiber 940 connected to the optical multiplex/demultiplex unit 920-i (i is an integer not less than 1 and not greater than N) is described as a trunk line fiber 940-i. A subordinate branch line fiber 950 connected to the optical multiplex/demultiplex unit 920-i is described as a branch line fiber 950-i. The optical network unit 930 connected to the branch line fiber 950-i is described as an optical network unit 930-i.

Downlink signals transmitted from the optical line terminal 910 reach all optical network units 930, via the trunk line fiber 940, the optical multiplex/demultiplex unit 920, and the branch line fiber 950. The optical network unit 930 selects and receives, from the input downlink signals, a signal to be transferred by its own device. On the other hand, uplink signals transmitted from the optical network units 930 reach the optical line terminal 910, via the branch line fiber 950, the optical multiplex/demultiplex unit 920, and the trunk line fiber 940.

CITATION LIST

Non-Patent Literature

Non-Patent Literature 1: Yukiya TATEISHI, Takahiro BABA, Yusuke SUZUKI, Kou TAKANI, "Broadband Radio Transmission in Railways", East Japan Railway Company, JR ESAT Techonical Review, No. 36 Summer 2011, p. 33-38

SUMMARY OF THE INVENTION

Technical Problem

In the conventional optical communication system, if the trunk line fiber is cut or the optical multiplex/demultiplex unit fails, all the optical multiplex/demultiplex units and the optical network units positioned downstream of the fault point will be unable to perform communications. For example, in FIG. 8, when the trunk line fiber 940-2 is cut, the optical multiplex/demultiplex units 920-2 to 920-N and the optical network units 930-2 to 930-N are unable to perform communications. Therefore, the upper the position of the fault point having occurred, the greater the influence. Further, the lower the device ranked, the lower the reliability.

In view of the above circumstances, the present invention intends to provide an optical communication system, an optical communication device, and an optical communication method capable of continuing communications even when the trunk line fiber is cut.

Means for Solving the Problem

An aspect of the present invention is an optical communication system in which an optical communication device and a plurality of optical transmission devices are loop-connected via transmission line, wherein the optical communication device includes an optical signal transmission unit configured to output, when no communication interruption occurs in the transmission line, an optical signal addressed to a communication destination device being another optical communication device that communicates with the own device to the transmission line connected to either one optical transmission device of two neighboring optical transmission devices, and output, at the time of communication interruption occurring in the transmission line, an optical signal addressed to the communication destination device to both of transmission lines connected to respective two neighboring optical transmission devices, and the optical transmission device includes a branch unit configured to branch the optical signal input from a neighboring device that is the neighboring optical communication device or another optical transmission device, and output branched optical signals to both of the transmission line connected to a neighboring device different from the neighboring device transmitted the optical signal and a transmission line connected to a subordinate communication destination device of the own device.

An aspect of the present invention is an optical communication device in an optical communication system in which the optical communication device and a plurality of optical transmission devices are loop-connected via transmission line, wherein the optical communication device includes an optical signal transmission unit configured to output, when no communication interruption occurs in the transmission line, an optical signal addressed to a communication destination device being another optical communication device that communicates with the own device to the transmission line connected to either one optical transmission device of two neighboring optical transmission devices, and output, at the time of communication interruption occurring in the transmission line, an optical signal addressed to the communication destination device to both of transmission lines connected to respective two neighboring optical transmission devices.

An aspect of the present invention is an optical communication method for an optical communication device in an optical communication system in which the optical communication device and a plurality of optical transmission devices are loop-connected via transmission line, wherein the method includes an optical signal transmission step of outputting, when no communication interruption occurs in the transmission line, an optical signal addressed to a communication destination device being another optical communication device that communicates with the own device to the transmission line connected to either one optical transmission device of two neighboring optical transmission devices, and outputting, at the time of communication interruption occurring in the transmission line, an optical signal addressed to the communication destination device to both of transmission lines connected to respective two neighboring optical transmission devices.

Effects of the Invention

According to the present invention, the optical communication system can continue communications even when the trunk line fiber is cut.

DESCRIPTION OF EMBODIMENTS

Hereinafter, embodiments of the present invention will be described in detail with reference to attached drawings.

First Embodiment

Figure 1:
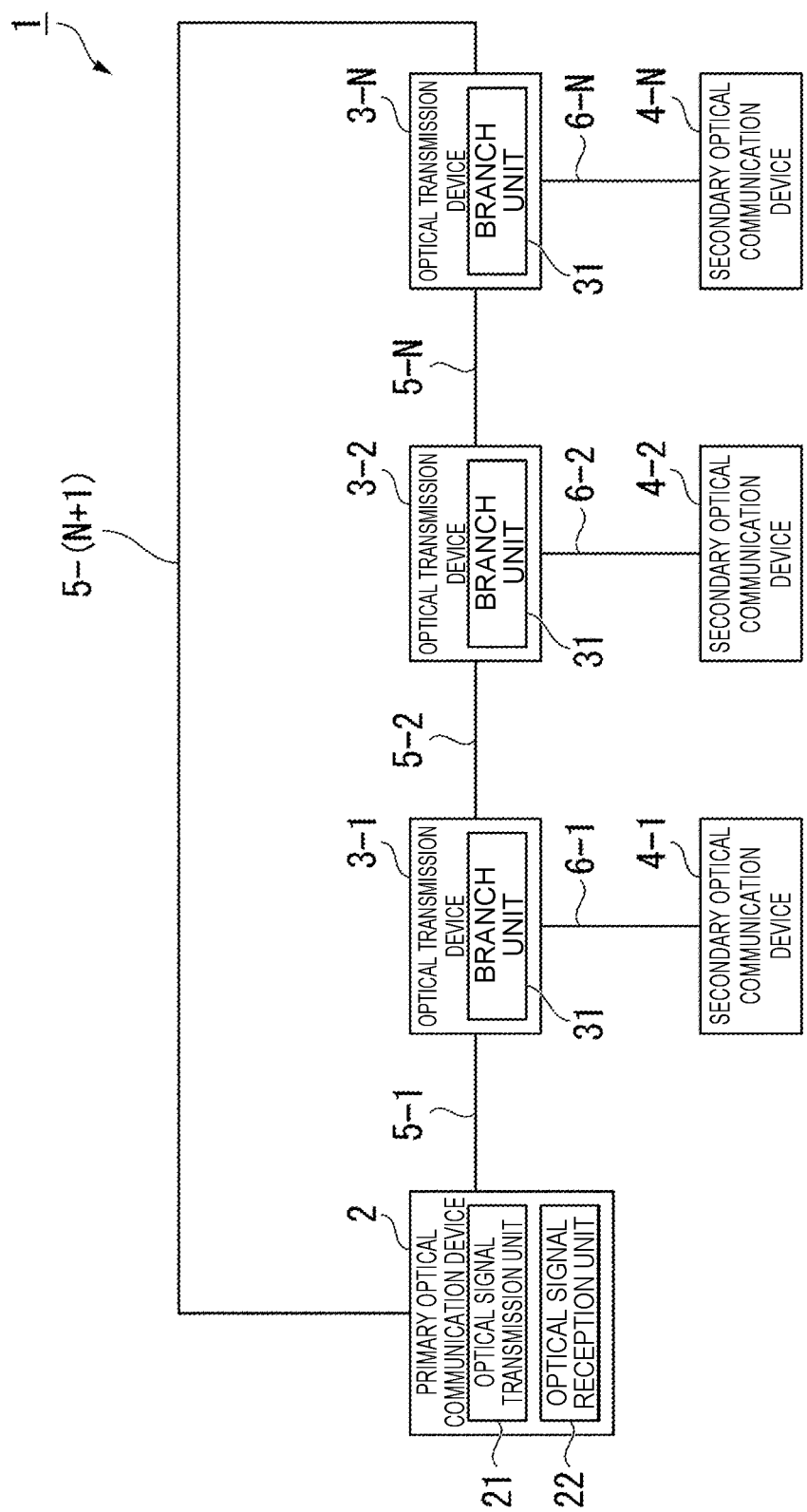
FIG. 1 is a diagram illustrating an exemplary configuration of an optical communication system according to a first embodiment of the present invention.

FIG. 1 is a diagram illustrating an exemplary configuration of an optical communication system 1 according to the first embodiment. The optical communication system 1 has a primary optical communication device 2, optical transmission devices 3, and secondary optical communication devices 4. The secondary optical communication devices 4 are communication destination devices of the primary optical communication device 2. When the optical communication system 1 is PON (Passive Optical Network), the primary optical communication device 2 is an optical line terminal (OLT) and the secondary optical communication device 4 is an optical network unit (ONU). The primary optical communication device 2 is loop-connected to N optical transmission devices 3-1 to 3-N via transmission lines 5 (N is an integer not less than 1). The N optical transmission devices 3 are referred to as optical transmission devices 3-1, 3-2, . . . , 3-N in the order of connection. For example, as the optical transmission device 3, an optical multiplex/demultiplex unit 300 described below with reference to FIG. 4 can be used, or a splitter can be used.

The transmission line 5 between the primary optical communication device 2 and the optical transmission device 3-1 is described as a transmission line 5-1. The transmission line 5 between the optical transmission device 3-($n-1$) and the optical transmission device 3-$n$ is described as a transmission line 5-$n$ (n is an integer not less than 2 and not greater than N). The transmission line 5 between the optical transmission device 3-N and the primary optical communication device 2 is described as a transmission line 5-(N+1). For example, the transmission lines 5-1 to 5-N are trunk transmission lines, and the transmission line 5-(N+1) is a lengthy transmission line. Optical fibers are usable as transmission lines 5.

The optical transmission devices 3 and the secondary optical communication devices 4 are connected by transmission lines 6. The transmission lines 6 are branch transmission lines. Optical fibers are usable as the transmission lines 6. The secondary optical communication device 4 connected to the optical transmission device 3-$i$ is described as a secondary optical communication device 4-$i$. The transmission line 6 between the optical transmission device 3-$i$ and the secondary optical communication device 4-$i$ is described as a transmission line 6-$i$ (i is an integer not less than 1 and not greater than N). Further, the orientation addressed to the secondary optical communication device 4 from the primary optical communication device 2 is described as downlink, and the orientation addressed to the primary optical communication device 2 from the secondary optical communication device 4 is described as uplink.

The primary optical communication device 2 includes an optical signal transmission unit 21 and an optical signal reception unit 22. The optical signal transmission unit 21, when no communication interruption occurs in the transmission line 5, outputs an optical signal addressed to the secondary optical communication device 4 communicating via the optical transmission device 3 to the transmission line 5, connected to any optical transmission device 3, of two neighboring optical transmission device 3-1 and the optical transmission device 3-N. Here, the primary optical communication device 2 multiplexes optical signals addressed to the secondary optical communication devices 4-1 to 4-N and transmits a multiplexed signal to the transmission line 5-1 being a trunk transmission line. The multiplexing may be wavelength multiplexing or time division multiplexing, or may be both of the wavelength multiplexing and the time division multiplexing.

The optical signal transmission unit 21, at the time of communication interruption occurring in the transmission line 5, outputs an optical signal addressed to the secondary optical communication device 4 to both of the transmission lines 5 connected to respective two neighboring optical transmission devices 3. That is, the optical signal transmission unit 21 outputs the optical signal addressed to the secondary optical communication device 4 to the transmission line 5-1 being a trunk transmission line and also to the transmission line 5-(N+1) being a lengthy transmission line. At this time, the optical signal transmission unit 21 may output the optical signal addressed to the same secondary optical communication device 4 to both of the transmission line 5-1 and the transmission line 5-(N+1). Alternatively, the optical signal transmission unit 21 may output the optical signal to either the transmission line 5-1 or the transmission line 5-(N+1) according to the addressed secondary optical communication device 4. For example, at the time of communication interruption occurring in a transmission line 5-$k$ (k is any integer not less than 1 and not greater than N), the optical signal transmission unit 21 outputs optical signals addressed to the secondary optical communication devices 4-1 to 4-($k$−1) to the transmission line 5-1, and outputs optical signals addressed to the secondary optical communication devices 4-$k$ to 4-N to the transmission line 5-(N+1).

The optical signal reception unit 22, when no communication interruption occurs in the transmission line 5, receives any one of the optical signals transmitted through the transmission line 5-1 and the optical signals transmitted through the transmission line 5-(N+1). When no communication interruption occurs in the transmission line 5, the same optical signal transmitted from the secondary optical communication device 4 is input to the primary optical communication device 2 from both of the transmission line 5-1 and the transmission line 5-(N+1). If the same signal is input from the both, the optical signal reception unit 22 cannot normally receive the optical signal due to signal collision. Therefore, when both of the optical signal transmitted through the transmission line 5-1 and the optical signal transmitted through the transmission line 5-(N+1) are input, the optical signal reception unit 22 performs reception processing on one of them. For example, the optical signal reception unit 22 receives the signal input from the transmission line 5-1 being a trunk transmission line. On the other hand, at the time of communication interruption occurring in the transmission line 5-$k$, optical signals transmitted from the respective secondary optical communication devices 4-1 to 4-($k$−1) are input from the transmission line 5-1 to the primary optical communication device 2. The optical signals transmitted from the respective secondary optical communication devices 4-$k$ to 4-N are input from the transmission line 5-(N+1) to the primary optical communication device 2. Therefore, the optical signal reception unit 22 receives both of the optical signal transmitted through the transmission line 5-1 and the optical signal transmitted through the transmission line 5-(N+1).

The optical transmission device 3 includes a branch unit 31. The branch unit 31 branches an optical signal input from a neighboring device, which is the neighboring primary optical communication device 2 or another optical transmission device 3. Neighboring devices of the optical transmission device 3-1 are the primary optical communication device 2 and the optical transmission device 3-2. Neighboring devices of the optical transmission device 3-$j$ are the optical transmission device 3-($j$−1) and the optical transmission device 3-($j$+1) (j is an integer not less than 1 and not greater than N−1). Neighboring devices of the optical transmission device 3-N are the optical transmission device 3-(N−1) and the primary optical communication device 2. The branch unit 31 outputs branched optical signals to both of the transmission line 5 connected to a neighboring device different from a neighboring device of the transmission source of the branched optical signal and the transmission line 6 connected to a subordinate secondary optical communication device 4 of the own device. Further, the branch unit 31 inputs an optical signal transmitted by a subordinate secondary optical communication device 4 from the transmission line 6, and branches and outputs the input optical signal to both of the transmission lines 5 connected to respective two neighboring devices.

An operation of the optical communication system 1 when no communication interruption occurs in the transmission line 5 will be described. First, downlink communication will be described. The optical signal transmission unit 21 of the primary optical communication device 2, when no communication interruption occurs in the transmission line 5, outputs a multiplex signal multiplexing downlink optical signals addressed to the respective secondary optical communication devices 4-1 to 4-N to the transmission line 5-1. The branch unit 31 of the optical transmission device 3-1 inputs the multiplex signal transmitted from the primary optical communication device 2, from the transmission line 5-1. The branch unit 31 of the optical transmission device 3-1 branches the input multiplex signal and outputs the branched signals to the transmission line 5-2 and the transmission line 6-1. The secondary optical communication device 4-1 inputs the multiplex signal from the transmission line 6-1 and receives an optical signal addressed to the own device from the multiplex signal. The secondary optical communication device 4-1 converts the received optical signal into an electric signal.

The branch unit 31 of the optical transmission device 3-$n$ (n is an integer not less than 2 and not greater than N) inputs the multiplex signal transmitted from the optical transmission device 3-($n$−1) via the transmission line 5-$n$. The branch unit 31 of the optical transmission device 3-$n$ branches the input multiplex signal and outputs the branched signals to the transmission line 5-($n$+1) and the transmission line 6-$n$. The secondary optical communication device 4-$n$ inputs the multiplex signal from the transmission line 6-$n$ and receives an optical signal addressed to the own device from the multiplex signal. The secondary optical communication device 4-$n$ converts the received optical signal into an electric signal.

Next, uplink communication when no communication interruption occurs in the transmission line 5 will be described. The secondary optical communication device 4-$i$ (i is an integer not less than 1 and not greater than N) transmits an uplink optical signal addressed to the primary optical communication device 2. The branch unit 31 of the optical transmission device 3-$i$ inputs, from the transmission line 6-$i$, the uplink optical signal transmitted by the secondary optical communication device 4-$i$. The branch unit 31 of the optical transmission device 3-$i$ branches the input uplink optical signal and inputs the branched signals to the transmission line 5-$i$ and the transmission line 5-($i$+1).

The optical signal reception unit 22 of the primary optical communication device 2 inputs the multiplex signal multiplexing the uplink optical signals transmitted from respective secondary optical communication devices 4-1 to 4-N, from both of the transmission line 5-1 and the transmission line 5-N. The optical signal reception unit 22 receives the multiplex signal input from the transmission line 5-1, and discards the multiplex signal input from the transmission line 5-N. The optical signal reception unit 22 separates the received multiplex signal into respective uplink optical signals. The optical signal reception unit 22 converts the separated uplink optical signals into electric signals.

An operation of the optical communication system 1 at the time of communication interruption occurring in the transmission line 5-$k$ will be described. First, downlink communication will be described. For example, when no signal has been received from the secondary optical communication devices 4-$k$ to 4-N for a predetermined period, the primary optical communication device 2 detects the communication interruption occurring in the transmission line 5-$k$. The primary optical communication device 2 may receive a notification of communication interruption in the transmission line 5-$k$ from a monitoring system (not illustrated) or the like. The optical signal transmission unit 21 of the primary optical communication device 2 outputs a multiplex signal multiplexing downlink optical signals addressed to respective secondary optical communication devices 4-1 to 4-N to the transmission line 5-1 and the transmission line 5-(N+1).

The optical transmission device 3-$i_1$ ($i_1$ is an integer not less than 1 and not greater than k−1) operates in the same manner as when no communication interruption occurs. That is, the branch unit 31 of the optical transmission device 3-$i_1$ inputs the multiplex signal from the transmission line 5-$i_1$. The branch unit 31 of the optical transmission device 3-$i_1$ branches the input multiplex signal, and outputs the branched signals to the transmission line 5-($i_1$+1) and the transmission line 6-$i_1$. The secondary optical communication device 4-$i_1$ inputs the multiplex signal from the transmission line 6-$i_1$, and receives an optical signal addressed to the own device from the multiplex signal. The secondary optical communication device 4-$i_1$ converts the received optical signal into an electric signal.

On the other hand, of the optical transmission device 3-$i_2$ ($i_2$ is an integer not less than k and not greater than N), the branch unit 31 of the optical transmission device 3-N inputs the multiplex signal transmitted from the primary optical communication device 2, from the transmission line 5-(N+1). The branch unit 31 of the optical transmission device 3-N branches the input multiplex signal and outputs the branched signal to the transmission line 5-(N−1) and the transmission line 6-N. The secondary optical communication device 4-N inputs the multiplex signal from the transmission line 6-N, and receives an optical signal addressed to the own device from the multiplex signal. The secondary optical communication device 4-N converts the received optical signal into an electric signal.

The branch unit 31 of the optical transmission device 3-$i_2$, except for the optical transmission device 3-N, inputs the multiplex signal transmitted by the optical transmission device 3-($i_2$+1), from the transmission line 5-($i_2$+1). The branch unit 31 of the optical transmission device 3-$i_2$ branches the input multiplex signal and outputs the branched signals to the transmission line 5-$i_2$ and the transmission line 6-$i_2$. The secondary optical communication device 4-$i_2$ inputs the multiplex signal from the transmission line 6-$i_2$, and receives an optical signal addressed to the own device from the multiplex signal. The secondary optical communication device 4-$i_2$ converts the received optical signal into an electric signal.

Uplink communication at the time of communication interruption occurring in the transmission line 5-$k$ will be described. The secondary optical communication device 4 and the optical transmission device 3 operate in the same manner as when no communication interruption occurs in the transmission line 5-$k$. That is, the secondary optical communication device 4-$i$ (i is an integer not less than 1 and not greater than N) transmits an uplink optical signal addressed to the primary optical communication device 2. The branch unit 31 of the optical transmission device 3-$i$ inputs, from the transmission line 6-$i$, the uplink optical signal transmitted from the secondary optical communication device 4-$i$. The branch unit 31 of the optical transmission device 3-$i$ branches the input uplink optical signal and inputs the branched signals to the transmission line 5-$i$ and the transmission line 5-($i$+1).

The optical signal reception unit 22 of the primary optical communication device 2 inputs the multiplex signal from each of the transmission line 5-1 and the transmission line 5-(N+1). The optical signal reception unit 22 separates the input multiplex signal into respective uplink optical signals. The optical signal reception unit 22 converts the separated uplink optical signals into electric signals. If the input multiplex signal is a time-multiplexed signal, the optical signal reception unit 22 will not be necessarily required to perform separation in the optical region. In this case, after conversion from the multiplex signal to the electric signal, the optical signal reception unit 22 reads an identifier and performs separation.

At the time of communication interruption occurring in the transmission line 5-$k$, the optical signal transmission unit 21 of the primary optical communication device 2 may output a multiplex signal multiplexing downlink optical signals addressed to respective secondary optical communication devices 4-1 to 4-($k$−1) to the transmission line 5-1, and may output a multiplex signal multiplexing downlink optical signals addressed to respective secondary optical communication devices 4-$k$ to 4-N to the transmission line 5-(N+1). The branch unit 31 of the optical transmission device 3-$i_1$ inputs, from transmission line 5-$i_1$, the multiplex signal multiplexing the downlink optical signals addressed to respective secondary optical communication devices 4-1 to 4-($k$−1). The branch unit 31 of the optical transmission device 3-$i_1$ branches the input multiplex signal and outputs the branched signals to the transmission line 5-($i_1$+1) and the transmission line 6-$i_1$. Further, the branch unit 31 of the optical transmission device 3-$i_2$ inputs, from the transmission line 5-($i_2$+1), the multiplex signal multiplexing the downlink optical signals addressed to respective optical communication devices 4-$k$ to 4-N. The branch unit 31 of the optical transmission device 3-$i_2$ branches the input multiplex signal and outputs the branched signals to the transmission line 5-$i_2$ and the transmission line 6-$i_2$.

When a coaxial cable is used for the trunk transmission line, communication may be hindered not only at the place downstream of the fault point but also in all devices. However, when the trunk transmission line is an optical fiber, communication is often feasible even when an optical fiber downstream of a certain splitter provided in the trunk transmission line is not terminated.

Figure 2:
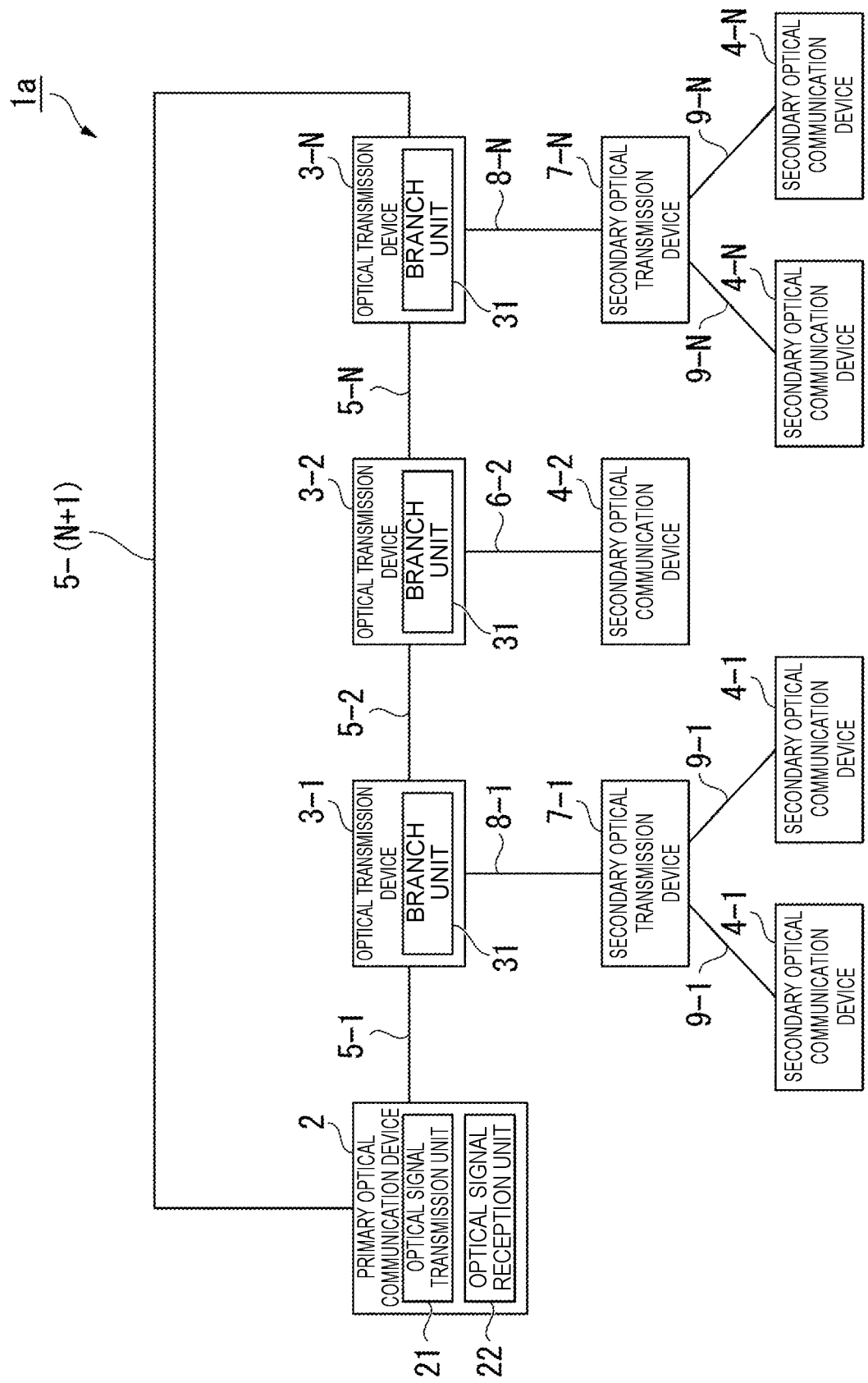
FIG. 2 is a diagram illustrating an exemplary configuration of an optical communication system according to the same embodiment.

The branch transmission line may be branched and the optical transmission devices may be connected to a plurality of secondary optical communication devices. FIG. 2 is a diagram illustrating an exemplary configuration of an optical communication system 1$a$ according to the present embodiment. The optical communication system 1$a$ illustrated in FIG. 2 is different from the optical communication system 1 illustrated in FIG. 1 in that an optical transmission device 3 is connected to a plurality of secondary optical communication devices 4 via a secondary optical transmission device 7. The secondary optical transmission device 7 connected to the optical transmission device 3-$i$ (i is an integer not less than 1 and not greater than N) is described as a secondary optical transmission device 7-$i$. The optical transmission device 3-$i$ and the secondary optical transmission device 7-$i$ are connected by a transmission line 8-$i$. The secondary optical transmission device 7-$i$ and each of a plurality of secondary optical communication devices 4-$i$ are connected by a transmission line 9-$i$.

With the above-described configuration, during the downlink communication, the secondary optical transmission device 7-$i$ inputs the multiplex signal branched by the optical transmission device 3-$i$ from the transmission line 8-$i$. The secondary optical transmission device 7-$i$ branches the input multiplex signal and outputs the branched multiplex signal to the transmission line 9-$i$ connected to each of the plurality of secondary optical communication devices 4-$i$. Each secondary optical communication device 4-$i$ inputs the multiplex signal from the transmission line 9-$i$ and receives an optical signal addressed to the own device from the input multiplex signal. Further, during the uplink communication, the secondary optical transmission device 7-$i$ inputs an uplink optical signal transmitted by each secondary optical communication device 4-$i$ from each of the plurality of transmission lines 9-$i$. The secondary optical transmission device 7-$i$ outputs a multiplex signal multiplexing the optical signals transmitted by respective secondary optical communication devices 4-$i$ to the transmission line 8-$i$. The branch unit 31 of the optical transmission device 3-$i$ inputs the uplink multiplex signal transmitted by the secondary optical transmission device 7-$i$ from the transmission line 8-$i$, branches the input multiplex signal, and outputs the branched signals to the transmission line 5-$i$ and transmission line 5-($i$+1).

Second Embodiment

In the second to fifth embodiments, the case where the optical communication system is PON will be described. An optical communication system according to the second embodiment generates an optical signal to be transmitted from a trunk line fiber and an optical signal to be transmitted from a lengthy fiber, when the trunk line fiber is cut, by copying a downlink electric signal.

Figure 3:
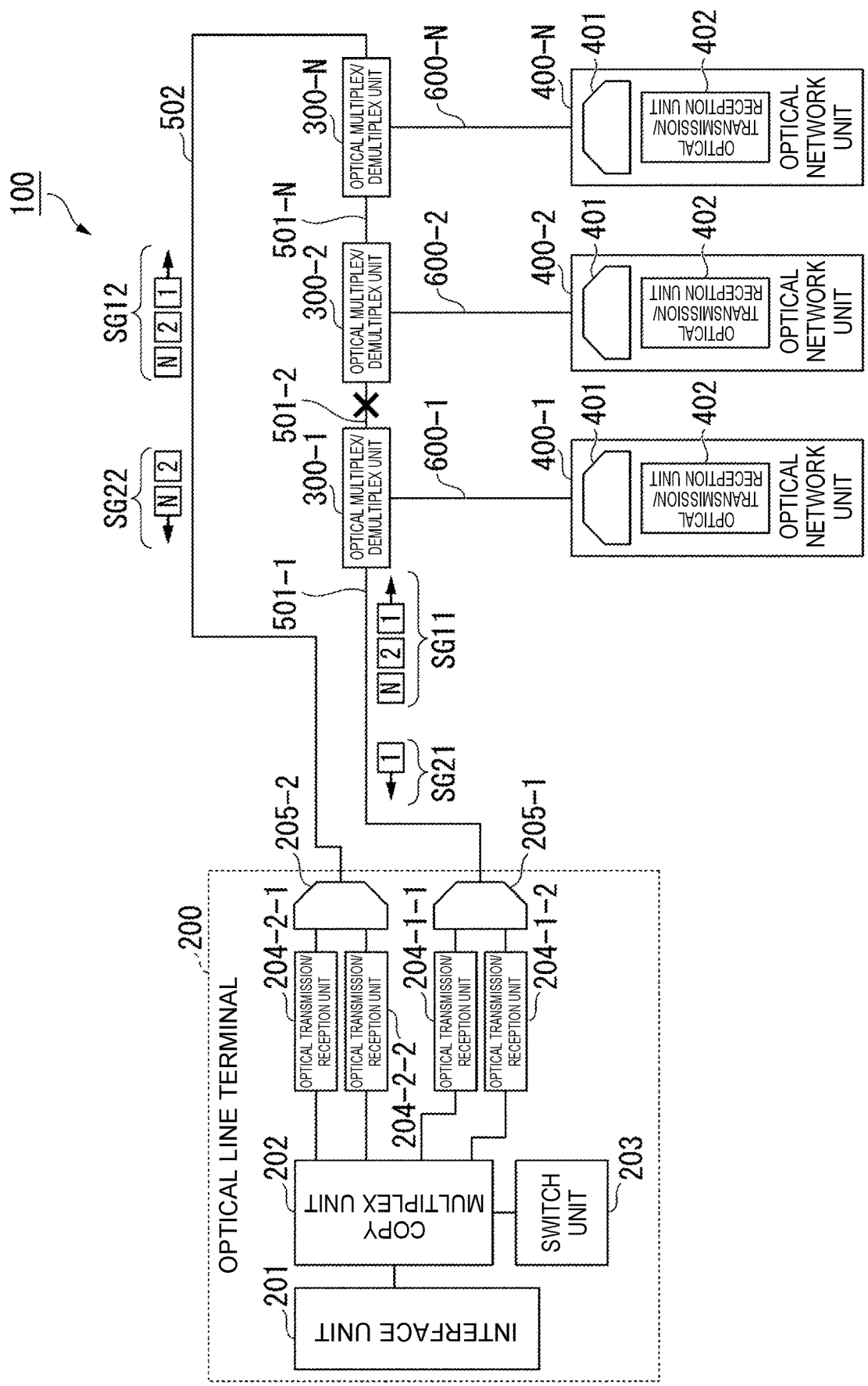
FIG. 3 is a diagram illustrating an exemplary configuration of an optical communication system according to a second embodiment.

FIG. 3 is a diagram illustrating a configuration of an optical communication system 100 according to the second embodiment. The optical communication system 100 has an optical line terminal 200, optical multiplex/demultiplex units 300, and optical network units 400. The optical line terminal 200 and N optical multiplex/demultiplex units 300 are connected by trunk line fibers 501. The N optical multiplex/demultiplex units 300 are described as optical multiplex/demultiplex units 300-1 to 300-N in the order of connection. The trunk line fiber 501 between the optical line terminal 200 and the optical multiplex/demultiplex unit 300-1 is described as a trunk line fiber 501-1. The trunk line fiber 501 between the optical multiplex/demultiplex unit 300-($n$−1) and the optical multiplex/demultiplex unit 300-$n$ is described as a trunk line fiber 501-$n$ (n is an integer not less than 2 and not greater than N). The optical line terminal 200 and the optical multiplex/demultiplex unit 300-N are connected by a lengthy fiber 502. The optical line terminal 200, the optical multiplex/demultiplex units 300, the optical network units 400, the trunk line fibers 501-1 to 501-N, and the lengthy fiber 502 correspond to the primary optical communication device 2, the optical transmission devices 3, the secondary optical communication devices 4, the transmission lines 5-1 to 5-N, and the transmission line 5-(N+1) of the first embodiment illustrated in FIG. 1, respectively.

The optical multiplex/demultiplex units 300 and the optical network units 400 are connected by branch line fibers 600. The optical network unit 400 connected to an optical multiplex/demultiplex unit 300-$i$ is described as an optical network unit 400-$i$. The branch line fiber 600 between the optical multiplex/demultiplex unit 300-$i$ and the optical network unit 400-$i$ is described as a branch line fiber 600-$i$ ($i$ is an integer not less than 1 and not greater than N). Further, the orientation addressed to the optical network unit 400 from the optical line terminal 200 is described as downlink, and the orientation addressed to the optical line terminal 200 from the optical network unit 400 is described as uplink.

The optical multiplex/demultiplex unit 300 may be connected to a plurality of optical network units 400 via a secondary optical multiplex/demultiplex unit corresponding to the secondary optical transmission device 7 illustrated in FIG. 2. During the downlink communication, the secondary optical multiplex/demultiplex unit branches the multiplex signal input from the optical multiplex/demultiplex unit 300 and outputs the branched signals to the plurality of subordinate optical network units 400. During the uplink communication, the second optical multiplexing/demultiplexing multiplexes uplink optical signals output from the plurality of subordinate optical network units 400 and outputs the multiplexed signal to the superior optical multiplex/demultiplex unit 300.

The optical line terminal 200 includes an interface unit 201, a copy multiplex unit 202, a switch unit 203, optical transmission/reception units 204-1, optical transmission/reception units 204-2, an optical multiplex separation unit 205-1, and an optical multiplex separation unit 205-2. The optical line terminal 200 includes one or more optical transmission/reception units 204-1 and one or more optical transmission/reception units 204-2. In the present embodiment, a case where two optical transmission/reception units 204-1 and two optical transmission/reception units 204-2 are provided will be exemplarily described. The two optical transmission/reception units 204-1 are described as optical transmission/reception units 204-1-1 and 204-1-2 respectively, and the two optical transmission/reception units 204-2 are described as optical transmission/reception units 204-2-1 and 204-2-2 respectively. The optical line terminal 200 performs wavelength multiplexing and time division multiplexing.

Respective units of the optical line terminal 200 may be provided at the same installation location or may be provided at geographically distant locations. Further, the optical multiplex separation units 205-1 and 205-2 may be devices provided outside the optical line terminal 200. Further, when the wavelength multiplexing is not performed, the optical line terminal 200 may not be provided with the optical multiplex separation units 205-1 and 205-2. In this case, the optical line terminal 210 may be provided with one optical transmission/reception unit 204-1 and one optical transmission/reception unit 204-2. Further, the copy multiplex unit 202 may include the switch unit 203. Further, the switch unit 203 may be a device provided outside the optical line terminal 200.

The interface unit 201 transmits and receives signals to and from superior devices (not illustrated). According to an instruction of the switch unit 203, the copy multiplex unit 202 performs processing for transmitting a downlink electric signal received by the interface unit 201 to the optical transmission/reception units 204-1, or processing for copying a downlink electric signal received by the interface unit 201 and transmitting it to the optical transmission/reception units 204-1 and the optical transmission/reception units 204-2. Further, according to an instruction from the switch unit 203, the copy multiplex unit 202 performs processing for outputting uplink electric signals input from the optical transmission/reception units 204-1 to the interface unit 201, or processing for outputting uplink electric signals input respectively from the optical transmission/reception units 204-1 and the optical transmission/reception units 204-2 to the interface unit 201.

The switch unit 203, when it is determined that there is no fiber disconnection, instructs the copy multiplex unit 202 to transmit downlink signals to the optical transmission/reception units 204-1 and receive uplink signals from the optical transmission/reception units 204-1. The switch unit 203, when it is determined that there is a fiber disconnection, instructs the copy multiplex unit 202 to transmit downlink signals to the optical transmission/reception units 204-1 and the optical transmission/reception units 204-2 and receive uplink signals from the optical transmission/reception units 204-1 and the optical transmission/reception units 204-2.

The optical transmission/reception units 204-1 convert downlink electric signals input from the copy multiplex unit 202 and addressed to respective optical network units 400 into optical signals, and output the converted signals to the optical multiplex separation unit 205-1. Further, the optical transmission/reception units 204-1 receive, from the optical multiplex separation unit 205-1, uplink optical signals transmitted by respective optical network units 400, convert the received optical signals into electric signals, and output the converted signals to the copy multiplex unit 202.

The wavelength multiplexing is used for the downlink optical signals and the uplink optical signals. In addition, the optical transmission/reception unit 204-1-1 and the optical transmission/reception unit 204-1-2 perform communications by the time division multiplexing and the wavelength multiplexing. That is, the optical transmission/reception unit 204-1-1 and the optical transmission/reception unit 204-1-2 transmit and receive optical signals different in wavelength. For example, the optical transmission/reception unit 204-1-1 performs time-division communications using wavelength $\lambda_{d1}$ for downlink optical signals and wavelength $\lambda_{u1}$ for uplink optical signals. The optical transmission/reception unit 204-1-2 performs time-division communications using wavelength $\lambda_{u2}$ for downlink optical signals and wavelength $\lambda_{u2}$ for uplink optical signals. A plurality of optical network units 400 perform time-division communications using wavelength $\lambda_{d1}$ for downlink optical signals and wavelength $\lambda_{u1}$ for uplink optical signals. Other optical network units 400 perform time-division communications using wavelength $\lambda_{d2}$ for downlink optical signals and wavelength $\lambda_{u2}$ for uplink optical signals. The optical signals transmitted and received by the optical transmission/reception unit 204-1-1 and the optical transmission/reception unit 204-1-2 may be variable in wavelength.

The optical transmission/reception units 204-2 convert downlink electric signals input from the copy multiplex unit 202 and addressed to respective optical network units 400 into optical signals and output the converted signals to the optical multiplex separation unit 205-2. Further, the optical transmission/reception units 204-2 receive, from the optical multiplex separation unit 205-2, uplink optical signals transmitted by respective optical network units 400, convert the received optical signals into electric signals, and output the converted signals to the copy multiplex unit 202. The optical transmission/reception unit 204-2-1 performs time-division communications using the same wavelength as the optical transmission/reception unit 204-1-1, and the optical transmission/reception unit 204-2-2 performs time-division communications using the same wavelength as the optical transmission/reception unit 204-1-2.

The optical multiplex separation unit 205-1 multiplexes respective downlink optical signals output by the optical transmission/reception unit 204-1-1 and the optical transmission/reception unit 204-1-2, and outputs a multiplexed signal to the trunk line fiber 501-1. Further, the optical multiplex separation unit 205-1 receives a multiplexed uplink optical signal from the trunk line fiber 501-1, and separates the multiplexed uplink optical signal. The optical multiplex separation unit 205-1 distributes and outputs the separated optical signals, according to the wavelength, to the optical transmission/reception unit 204-1-1 and the optical transmission/reception unit 204-1-2.

The optical multiplex separation unit 205-2 multiplexes respective downlink optical signals output by the optical transmission/reception unit 204-2-1 and the optical transmission/reception unit 204-2-2, and outputs a multiplexed signal to the lengthy fiber 502. Further, the optical multiplex separation unit 205-2 receives a multiplexed uplink optical signal from the lengthy fiber 502 and separates the multiplexed uplink optical signal. The optical multiplex separation unit 205-2 distributes and outputs the separated optical signals, according to the wavelength, to the optical transmission/reception unit 204-2-1 and the optical transmission/reception unit 204-2-2.

The optical network unit 400 includes an optical multiplex separation unit 401 and an optical transmission/reception unit 402. The optical multiplex separation unit 401 separates a downlink multiplex signal received from the branch line fiber 600 and outputs the separated signals to the optical transmission/reception unit 402. Further, the optical multiplex separation unit 401 outputs optical signals output by the optical transmission/reception unit 402 to the branch line fiber 600. The optical transmission/reception unit 402 selects an optical signal addressed to the own device from the downlink optical signals separated by the optical multiplex separation unit 401, and converts the selected signal into an electric signal. Further, the optical transmission/reception unit 402 converts electric signals into uplink optical signals, and outputs the converted signals to the optical multiplex separation unit 401. The optical signals transmitted and received by the optical transmission/reception unit 402 may be variable in wavelength.

Figure 4:
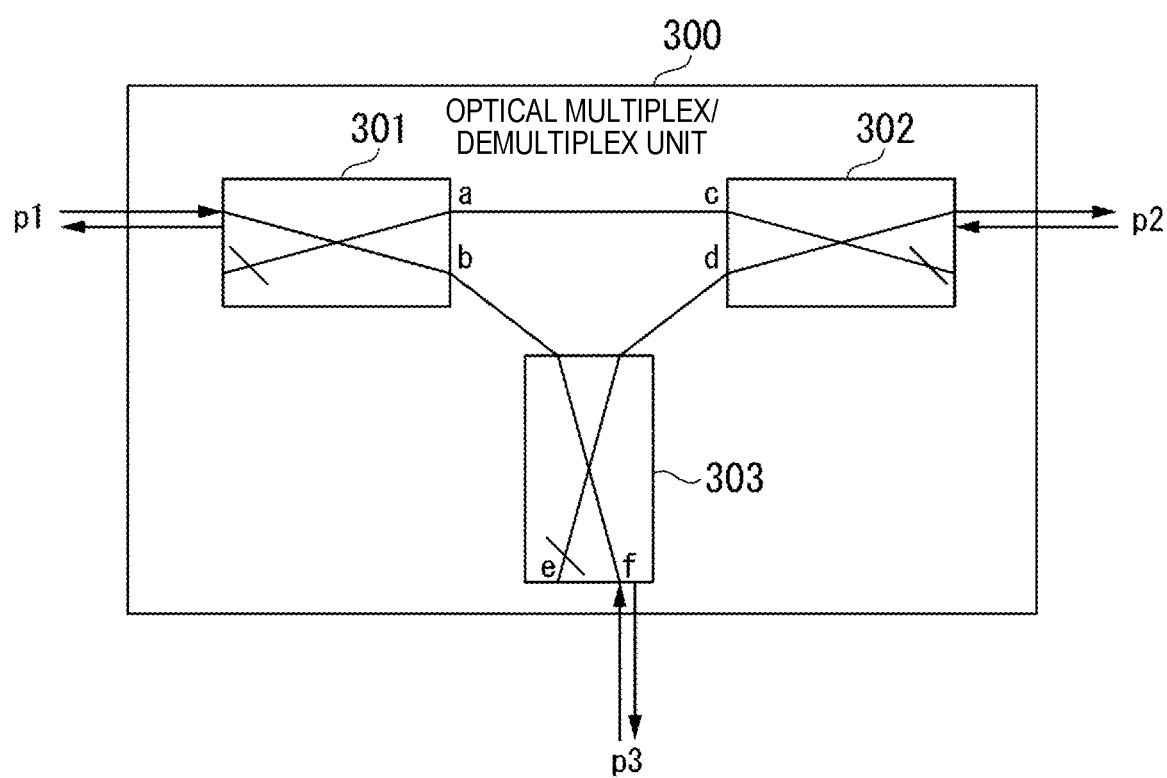
FIG. 4 is a diagram illustrating an exemplary configuration of an optical multiplex/demultiplex unit according to the same embodiment.

FIG. 4 is a diagram illustrating an exemplary configuration of the optical multiplex/demultiplex unit 300. The optical multiplex/demultiplex unit 300 has 3 dB couplers 301, 302, and 303. Reference numeral p1 corresponds to the trunk line fiber 501 connected to a one-higher neighboring device, reference numeral p2 corresponds to the trunk line fiber 501 or the lengthy fiber 502 connected to a one-lower neighboring device, and reference numeral p3 corresponds to the branch line fiber 600. The optical multiplex/demultiplex unit 300 has a nature of transmitting optical signals from reference numeral p1 to reference numeral p2 and reference numeral p3, transmitting optical signals from reference numeral p2 to reference numeral p1 and reference numeral p3, and transmitting optical signals from reference numeral p3 to reference numeral p1 and reference numeral p2.

The 3 dB coupler 301 has a port "a" as a port connected to the 3 dB coupler 302 and a port "b" as a port connected to the 3 dB coupler 303. The 3 dB coupler 302 has a port "c" as a port connected to the 3 dB coupler 301 and a port "d" as a port connected to the 3 dB coupler 303. The 3 dB coupler 303 has a port "f" as a port connected to the branch line fiber 600. In the case of equal branching, the optical signal output from the port "a" of the 3 dB coupler 301 and the optical signal output from the port "b" are the same in optical intensity, and the optical signal output from the port "c" of the 3 dB coupler 302 and the optical signal output from the port "d" are the same in optical intensity. Further, for example, in the 3 dB coupler 301, in the case of unequal branching such as port "a">port "b", regarding the optical signal input from the reference numeral p1, the optical intensity output to the port "b" is attenuated than the optical intensity output from the port "a". The above-described configuration is an example. For example, in the 3 dB coupler 303, a port "e" may be another output port connected to the branch line fiber 600. The number of ports may be increased.

Next, with reference to FIG. 3, an operation of the optical communication system 100 when no communication interruption occurs in the trunk line fiber 501 will be described. When no communication interruption occurs, the switch unit 203 of the optical line terminal 200 instructs the copy multiplex unit 202 to stop using the lengthy fiber 502 side. The copy multiplex unit 202 disables the ports to the optical transmission/reception unit 204-2-1 and the optical transmission/reception unit 204-2-2.

First, downlink communication will be described. The interface unit 201 of the optical line terminal 200 receives respective downlink signals addressed to optical network units 400-1 to 400-N from a superior device (not illustrated), and outputs them to the copy multiplex unit 202. The copy multiplex unit 202 distributes and outputs the downlink signals received by the interface unit 201 to the optical transmission/reception unit 204-1-1 and the optical transmission/reception unit 204-1-2 according to the wavelength used by a destination optical network unit 400. The optical transmission/reception unit 204-1-1 and the optical transmission/reception unit 204-1-2 convert the downlink electric signals input from the copy multiplex unit 202 into optical signals, and output the converted signals to the optical multiplex separation unit 205-1. The optical multiplex separation unit 205-1 multiplexes respective downlink optical signals output by the optical transmission/reception unit 204-1-1 and the optical transmission/reception unit 204-1-2 and outputs a multiplexed signal to the trunk line fiber 501-1.

The optical multiplex/demultiplex unit 300-$i$ inputs, from the trunk line fiber 501-$i$, a downlink multiplex signal transmitted from the optical multiplex/demultiplex unit 300-($i$−1). The optical multiplex/demultiplex unit 300-$i$ branches the input multiplex signal, and outputs the branched signals to the trunk line fiber 501-($i$+1) and the branch line fiber 600-$i$. The optical multiplex/demultiplex unit 300-N branches the input multiplex signal and outputs the branched signals to the lengthy fiber 502 and the branch line fiber 600-N. The optical network unit 400-$i$ inputs the multiplex signal from the branch line fiber 600-$i$, and selects and receives an optical signal addressed to the own device from the multiplex signal. The optical network unit 400 converts the received optical signal into an electric signal and relays the converted signal to a subordinate communication device (not illustrated).

Next, uplink communication when no communication interruption occurs in the trunk line fiber 501 will be described. Respective optical network units 400 transmit uplink optical signals. The optical multiplex/demultiplex unit 300-$i$ inputs, from the branch line fiber 600-$i$, the uplink optical signal transmitted by the optical network unit 400-$i$. The optical multiplex/demultiplex unit 300-$i$ branches the input uplink optical signal and inputs the branched signals to the trunk line fiber 501-$i$ and the trunk line fiber 501-($i$+1). The optical multiplex/demultiplex unit 300-N outputs the input uplink optical signal to the branch line fiber 600-(N−1) and the lengthy fiber 502.

The optical multiplex separation unit 205-1 of the optical line terminal 200 inputs the uplink multiplex signal from the trunk line fiber 501-1, and distributes and outputs uplink optical signals obtained by separating the multiplex signal, according to the wavelength of the optical signal, to the optical transmission/reception unit 204-1-1 and the optical transmission/reception unit 204-1-2. The optical transmission/reception unit 204-1-1 and the optical transmission/reception unit 204-1-2 convert the uplink optical signals input from the optical multiplex separation unit 205-1 into electric signals and output the converted signals to the copy multiplex unit 202.

On the other hand, the optical multiplex separation unit 205-2 of the optical line terminal 200 inputs the uplink multiplex signal from the lengthy fiber 502, and distributes and outputs uplink optical signals obtained by separating the multiplex signal, according to the wavelength of the optical signal, to the optical transmission/reception unit 204-2-1 and the optical transmission/reception unit 204-2-2. The optical transmission/reception unit 204-2-1 and the optical transmission/reception unit 204-2-2 convert the uplink optical signals input from the optical multiplex separation unit 205-1 into electric signals and output the converted signals to the copy multiplex unit 202.

The copy multiplex unit 202 does not receive the uplink electric signal output by the optical transmission/reception unit 204-2-1 and the optical signal output by the optical transmission/reception unit 204-2-2, but receives the uplink electric signal output by the optical transmission/reception unit 204-1-1 and the uplink electric signal output by the optical transmission/reception unit 204-1-2, and outputs them to the interface unit 201. The interface unit 201 outputs the uplink electric signal received from the copy multiplex unit 202 to a superior device (not illustrated) according to the destination.

Next, an operation of the optical communication system 100 at the time of communication interruption occurring in the trunk line fiber 501-$k$ will be described. For example, when no signal is received from the optical network units 400-$k$ to 400-N for a predetermined period, the optical line terminal 200 detects the occurrence of communication interruption in the trunk line fiber 501-$k$. When the occurrence of communication interruption in the trunk line fiber 501-$k$ is detected, the switch unit 203 of the optical line terminal 200 instructs the copy multiplex unit 202 to use the trunk line fiber 501-1 side and the lengthy fiber 502 side. The copy multiplex unit 202 enables the ports to the optical transmission/reception unit 204-1-1, the optical transmission/reception unit 204-1-2, the optical transmission/reception unit 204-2-1, and the optical transmission/reception unit 204-2-2.

First, downlink communication will be described. The interface unit 201 of the optical line terminal 200 receives respective downlink signals addressed to the optical network units 400-1 to 400-N from a superior device (not illustrated), and outputs them to the copy multiplex unit 202. The copy multiplex unit 202 copies the downlink signals received by the interface unit 201. The copy multiplex unit 202 distributes and outputs the downlink signals to the optical transmission/reception unit 204-1-1 and the optical transmission/reception unit 204-1-2 according to the wavelength used by a destination optical network unit 400. In addition, the copy multiplex unit 202 outputs the copy of the optical signal output to the optical transmission/reception unit 204-1-1 to the optical transmission/reception unit 204-2-1, and outputs the copy of the optical signal output to the optical transmission/reception unit 204-1-2 to the optical transmission/reception unit 204-2-2.

The optical transmission/reception unit 204-1-1 and the optical transmission/reception unit 204-1-2 convert the downlink electric signals input from the copy multiplex unit 202 into optical signals, and output the converted signals to the optical multiplex separation unit 205-1. The optical multiplex separation unit 205-1 multiplexes respective downlink optical signals output from the optical transmission/reception unit 204-1-1 and the optical transmission/reception unit 204-1-2, and outputs it to the trunk line fiber 501-1. A multiplex signal SG11 multiplexing respective optical signals addressed to the optical network units 400-1 to 400-N is transmitted to the trunk line fiber 501-1.

The optical transmission/reception unit 204-2-1 and the optical transmission/reception unit 204-2-2 convert the downlink electric signals input from the copy multiplex unit 202 into optical signals and output the converted signals to the optical multiplex separation unit 205-2. The optical multiplex separation unit 205-2 multiplexes respective downlink optical signals output by the optical transmission/reception unit 204-2-1 and the optical transmission/reception unit 204-2-2, and outputs it to the lengthy fiber 502. A multiplex signal SG12 multiplexing respective optical signals addressed to the optical network units 400-1 to 400-N is transmitted to the lengthy fiber 502.

The optical multiplex/demultiplex unit 300-$i_1$ ($i_1$ is an integer not less than 1 and not greater than k−1) operates in the same manner as when no communication interruption occurs. That is, the optical multiplex/demultiplex unit 300-$i_1$ inputs the multiplex signal SG11 from the trunk line fiber 501-$i_1$. The optical multiplex/demultiplex unit 300-$i_1$ branches the input multiplex signal SG11, and outputs the branched signals to the trunk line fiber 501-($i_1$+1) and the branch line fiber 600-$i_1$. The optical network unit 400-$i_1$ inputs the multiplex signal SG11 from the branch line fiber 600-$i_1$, and receives an optical signal addressed to the own device from the multiplex signal SG11. The optical network unit 400-$i_1$ converts the received optical signal into an electric signal, and relays it to a subordinate communication device (not illustrated).

On the other hand, of the optical multiplex/demultiplex unit 300-$i_2$ ($i_2$ is an integer not less than k and not greater than N), the optical multiplex/demultiplex unit 300-N inputs the multiplex signal SG12 transmitted from the optical line terminal 200, from the lengthy fiber 502. Further, the optical multiplex/demultiplex unit 300-$i_2$, except for the optical multiplex/demultiplex unit 300-N, inputs the multiplex signal SG12 transmitted by the optical multiplex/demultiplex unit 300-($i_2$+1), from the trunk line fiber 501-($i_2$+1). The optical multiplex/demultiplex unit 300-$i_2$ branches the input multiplex signal SG12 and outputs the branched signals to the trunk line fiber 501-$i_2$ and the branch line fiber 600-$i_2$. The optical network unit 400-$i_2$ inputs the multiplex signal SG12 from the branch line fiber 600-$i_2$, and receives an optical signal addressed to the own device from the multiplex signal SG12. The optical network unit 400-$i_2$ converts the received optical signal into an electric signal, and relays it to a subordinate communication device (not illustrated).

Uplink communication at the time of communication interruption occurring in the trunk line fiber 501-k will be described. The optical network unit 400 and the optical multiplex/demultiplex unit 300 perform in the same manner as when no communication interruption occurs in the trunk line fiber 501-k. That is, respective optical network units 400 transmit uplink optical signals addressed to the optical line terminal 200. The optical multiplex/demultiplex unit 300-$i$ inputs the uplink optical signal transmitted by the optical network unit 400-$i$ from the branch line fiber 600-$i$. The optical multiplex/demultiplex unit 300-$i$ branches the input uplink optical signal and inputs the branched signals to the trunk line fiber 501-$i$ and the trunk line fiber 501-($i$+1). However, the optical multiplex/demultiplex unit 300-N inputs the uplink optical signal to the uplink trunk line fiber 501-$i$ and the lengthy fiber 502. Thus, a multiplex signal SG21 multiplexing respective uplink optical signals transmitted by the optical network units 400-1 to 400-(k−1) is transmitted to the trunk line fiber 501-1. A multiplex signal SG22 multiplexing respective uplink optical signals transmitted by the optical network units 400-(k+1) to 400-N is transmitted to the lengthy fiber 502.

The optical multiplex separation unit 205-1 of the optical line terminal 200 inputs the uplink multiplex signal SG21 from the trunk line fiber 501-1, and distributes and outputs uplink optical signals obtained by separating the multiplex signal SG21, according to the wavelength of the optical signal, to the optical transmission/reception unit 204-1-1 and the optical transmission/reception unit 204-1-2. The optical transmission/reception unit 204-1-1 and the optical transmission/reception unit 204-1-2 convert the uplink optical signals input from the optical multiplex separation unit 205-1 into electric signals and output the converted signals to the copy multiplex unit 202.

On the other hand, the optical multiplex separation unit 205-2 of the optical line terminal 200 inputs the uplink multiplex signal SG22 from the lengthy fiber 502, and distributes and outputs uplink optical signals obtained by separating the multiplex signal SG22, according to the wavelength of the optical signal, to the optical transmission/reception unit 204-2-1 and the optical transmission/reception unit 204-2-2. The optical transmission/reception unit 204-2-1 and the optical transmission/reception unit 204-2-2 convert the optical signals input from the optical multiplex separation unit 205-1 into electric signals and output them to the copy multiplex unit 202.

The copy multiplex unit 202 outputs the uplink electric signal output by the optical transmission/reception unit 204-1-1, the uplink electric signal output by the optical transmission/reception unit 204-1-2, the uplink electric signal output by the optical transmission/reception unit 204-2-1, and the uplink electric signal output by the optical transmission/reception unit 204-2-2 to the interface unit 201. The interface unit 201 outputs each uplink electric signal received from the copy multiplex unit 202, according to the destination, to a superior device (not illustrated).

Third Embodiment

In the second embodiment, when the trunk line fiber is cut, the optical line terminal transmits the downlink signal addressed to the same optical network unit to both of the trunk line fiber and the lengthy fiber. In the present embodiment, when the trunk line fiber is cut, the optical line terminal transmits optical signals addressed to optical network units connected to the trunk line fiber adjacent to the optical line terminal than the cut point to the trunk line fiber, and transmits optical signals addressed to optical network units connected to the trunk line fiber distant from the cut point to the lengthy fiber. Hereinafter, differences between the third embodiment and the second embodiment will be mainly described.

Figure 5:
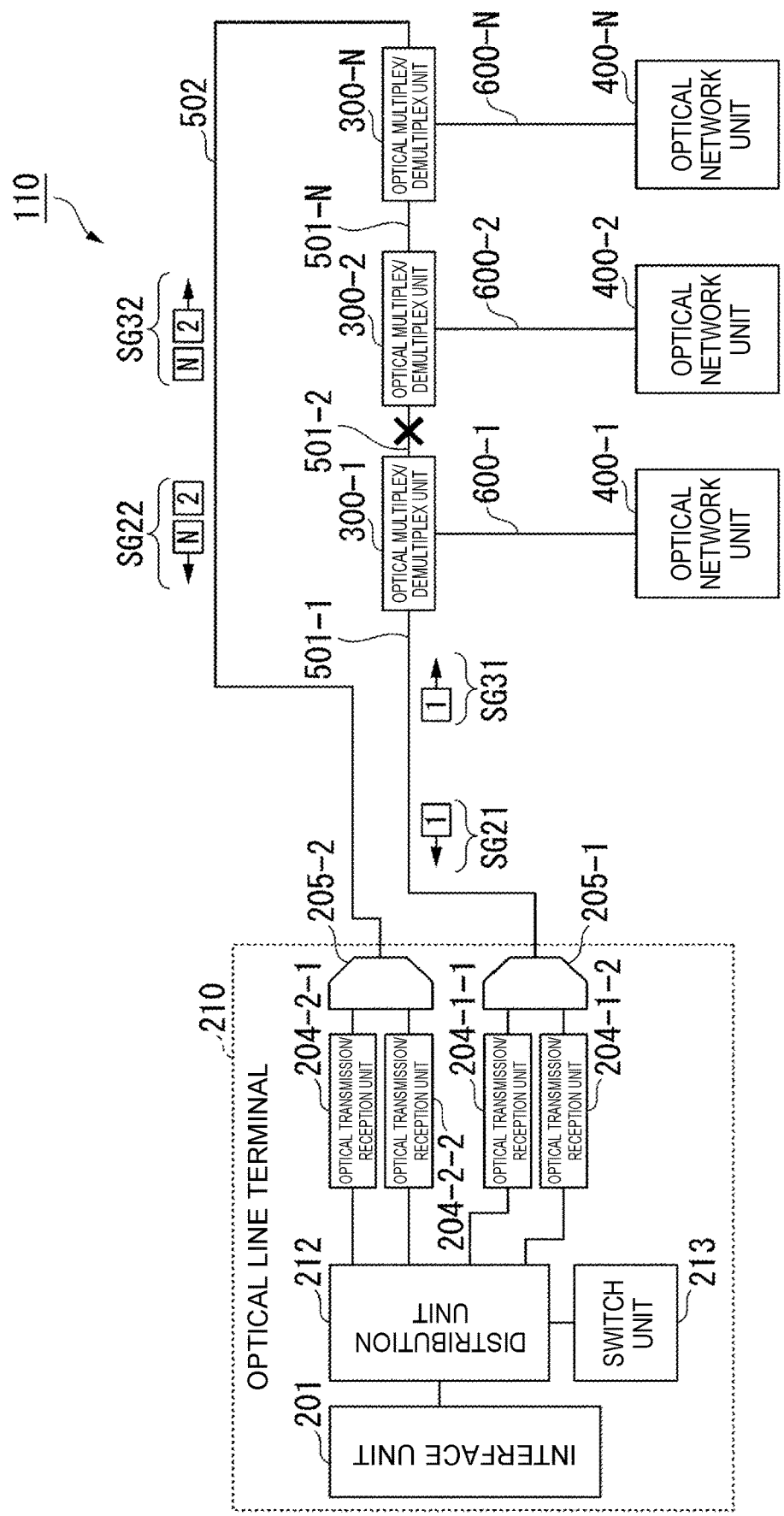
FIG. 5 is a diagram illustrating an exemplary configuration of an optical communication system according to a third embodiment.

FIG. 5 is a diagram illustrating a configuration of an optical communication system 110 according to the third embodiment. In this drawing, the same components as those of the optical communication system 100 according to the second embodiment illustrated in FIG. 3 are denoted by the same reference numerals and descriptions thereof will be omitted. The optical communication system 110 is different from the optical communication system 100 of the second embodiment in that the optical line terminal 200 is replaced by an optical line terminal 210.

The optical line terminal 210 is different from the optical line terminal 200 illustrated in FIG. 3 in that the copy multiplex unit 202 and the switch unit 203 are replaced by a distribution unit 212 and a switch unit 213.

According to an instruction of the switch unit 213, the distribution unit 212 performs processing for transmitting downlink electric signals received by the interface unit 201 to the optical transmission/reception units 204-1, or performs processing for distributing and transmitting downlink electric signals received by the interface unit 201 to the optical transmission/reception units 204-1 or the optical transmission/reception units 204-2, depending on respective destinations. Further, according to an instruction of the switch unit 213, the distribution unit 212 performs processing for outputting uplink electric signals input from the optical transmission/reception units 204-1 to the interface unit 201, or performs processing for outputting uplink electric signals input respectively from the optical transmission/reception units 204-1 and the optical transmission/reception units 204-2 to the interface unit 201.

When it is determined that there is no fiber disconnection, the switch unit 213 instructs the distribution unit 212 to transmit downlink signals to the optical transmission/reception units 204-1 and receive uplink signals from the optical transmission/reception units 204-1. When it is determined that there is a fiber disconnection, the switch unit 213 instructs the distribution unit 212 to transmit downlink optical signals addressed to optical network units 400 connected to the trunk line fiber 501 adjacent to the optical line terminal 210 than the cut point to the optical transmission/reception units 204-1, and transmit downlink optical signals addressed to optical network units 400 connected to the trunk line fiber 501 distant from the cut point to the optical transmission/reception units 204-2. Further, when it is determined that there is a fiber disconnection, the switch unit 213 instructs the distribution unit 212 to receive uplink signals from the optical transmission/reception units 204-1 and the optical transmission/reception units 204-2.

Respective units of the optical line terminal 210 may be provided at the same installation location or may be provided at geographically distant locations. Further, the optical multiplex separation units 205-1 and 205-2 may be devices provided outside the optical line terminal 210. Further, when the wavelength multiplexing is not performed, the optical line terminal 210 may not be provided with the optical multiplex separation units 205-1 and 205-2. In this case, the optical line terminal 210 may be provided one optical transmission/reception unit 204-1 and one optical transmission/reception unit 204-2. Further, the distribution unit 212 may include the switch unit 213. Further, the switch unit 213 may be a device provided outside the optical line terminal 210.

Next, an operation of the optical communication system 110 will be described. When no communication interruption occurs in the trunk line fiber 501, the operation of the optical communication system 110 is the same as that of the second embodiment. That is, when no communication interruption occurs, the switch unit 213 of the optical line terminal 210 instructs the distribution unit 212 to stop using the lengthy fiber 502 side. The distribution unit 212 disables the ports to the optical transmission/reception unit 204-2-1 and the optical transmission/reception unit 204-2-2. During the downlink communication, the distribution unit 212 distributes and transmits downlink signals received by the interface unit 201 to the optical transmission/reception unit 204-1-1 and the optical transmission/reception unit 204-1-2 according to the wavelength used by a destination optical network unit 400. During the uplink communication, the distribution unit 212 outputs uplink electric signals output by the optical transmission/reception unit 204-1-1 and uplink electric signals output by the optical transmission/reception unit 204-1-2 to the interface unit 201.

Next, operation of the optical communication system 110 at the time of communication interruption occurring in the trunk line fiber 501-$k$ will be described. When the occurrence of communication interruption in the trunk line fiber 501-$k$ is detected, the switch unit 213 of the optical line terminal 210 instructs the distribution unit 212 to use the trunk line fiber 501-1 side and the lengthy fiber 502 side. In addition, the switch unit 213 instructs the distribution unit 212 to transmit signals addressed to the optical multiplex/demultiplex unit 300-$i_1$ ($i_1$ is not less than 1 and not greater than k−1) to the trunk line fiber 501-1 side, and transmit signals addressed to the optical multiplex/demultiplex unit 300-$i_2$ ($i_2$ is not less than k and not greater than N) to the lengthy fiber 502 side. The distribution unit 212 enables the ports to the optical transmission/reception unit 204-1-1, the optical transmission/reception unit 204-1-2, the optical transmission/reception unit 204-2-1, and the optical transmission/reception unit 204-2-2.

First, downlink communication at the time of communication interruption occurring will be described. The interface unit 201 of the optical line terminal 210 receives respective downlink signals addressed to the optical network units 400-1 to 400-N from a superior device (not illustrated), and outputs them to the distribution unit 212. The distribution unit 212 distributes and outputs respective optical signals addressed to the optical network units 400-1 to 400-($k$−1) according to wavelengths used by the destination optical network units 400-1 to 400-($k$−1), to the optical transmission/reception unit 204-1-1 and the optical transmission/reception unit 204-1-2. In addition, the distribution unit 212 distributes and outputs respective signals addressed to the optical network units 400-$k$ to 400-N, according to wavelengths used by the destination optical network units 400-$k$ to 400-N, to the optical transmission/reception unit 204-2-1 and the optical transmission/reception unit 204-2-2.

The optical transmission/reception unit 204-1-1 and the optical transmission/reception unit 204-1-2 convert respective downlink electric signals input from the distribution unit 212 into optical signals and output the converted signals to the optical multiplex separation unit 205-1. The optical multiplex separation unit 205-1 outputs a multiplex signal SG31 multiplexing respective downlink optical signals output by the optical transmission/reception unit 204-1-1 and the optical transmission/reception unit 204-1-2 to the trunk line fiber 501-1.

The optical transmission/reception unit 204-2-1 and the optical transmission/reception unit 204-2-2 convert respective downlink electric signals input from the distribution unit 212 into optical signals and output the converted signals to the optical multiplex separation unit 205-2. The optical multiplex separation unit 205-2 outputs a multiplex signal SG32 multiplexing respective downlink optical signals output by the optical transmission/reception unit 204-2-1 and the optical transmission/reception unit 204-2-2 to the lengthy fiber 502.

The following processing is the same as that of the second embodiment, except that the optical multiplex/demultiplex unit 300-$i_1$ and the optical network unit 400-$i_1$ input the multiplex signal SG31 and the optical multiplex/demultiplex unit 300-$i_2$ and the optical network unit 400-$i_2$ input the multiplex signal SG32.

Further, the operation of uplink communication of the optical communication system 110 at the time of occurrence of communication interruption is the same as that of the second embodiment. The distribution unit 212 of the optical line terminal 210 receives respective uplink electric signals from the optical network units 400-1 to 400-($k$–1) being their transmission sources from the optical transmission/reception unit 204-1-1 or the optical transmission/reception unit 204-1-2, and receives respective uplink electric signals from the optical network units 400-$k$ to 400-N being their transmission sources from the optical transmission/reception unit 204-2-1 or the optical transmission/reception unit 204-2-2. The distribution unit 212 outputs the uplink electric signal output by the optical transmission/reception unit 204-1-1, the uplink electric signal output by the optical transmission/reception unit 204-1-2, the uplink electric signal output by the optical transmission/reception unit 204-2-1, and the uplink electric signal output by the optical transmission/reception unit 204-2-2 to the interface unit 201.

Fourth Embodiment

In the second embodiment, when the trunk line fiber is cut, the optical line terminal copies the downlink electric signal, converts one copied signal into an optical signal to be transmitted from the trunk line fiber, and converts the other copied signal into an optical signal to be transmitted from the lengthy fiber. An optical line terminal of the present embodiment branches an optical signal and generates an optical signal to be transmitted form the trunk line fiber and an optical signal to be transmitted from the lengthy fiber. Hereinafter, differences between the fourth embodiment and the second embodiment will be mainly described.

Figure 6:
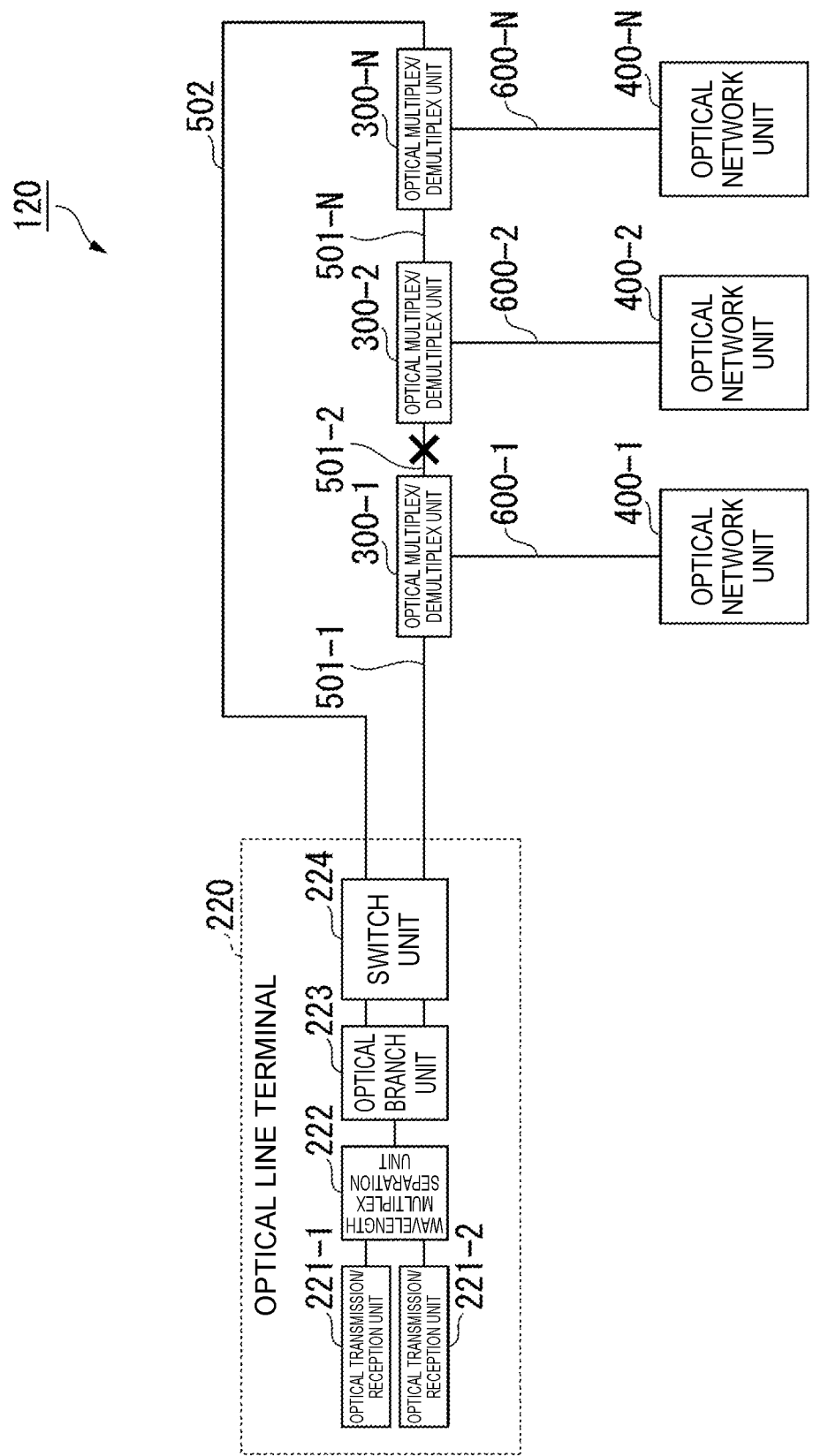
FIG. 6 is a diagram illustrating an exemplary configuration of an optical communication system according to a fourth embodiment.

FIG. 6 is a diagram illustrating a configuration of an optical communication system 120 according to the fourth embodiment. In this drawing, the same components as those of the optical communication system 100 according to the second embodiment illustrated in FIG. 3 are denoted by the same reference numerals and descriptions thereof will be omitted. The optical communication system 120 is different from the optical communication system 100 of the second embodiment in that the optical line terminal 200 is replaced by an optical line terminal 220.

The optical line terminal 220 includes an optical transmission/reception unit 221-1, an optical transmission/reception unit 221-2, a wavelength multiplex separation unit 222, an optical branch unit 223, and a switch unit 224. Respective units of the optical line terminal 220 may be provided at the same installation location or may be provided at geographically distant locations. Further, when the wavelength multiplexing is not performed, the optical line terminal 220 may not be provided with the wavelength multiplex separation unit 222.

The optical transmission/reception unit 221-1 and the optical transmission/reception unit 221-2 convert downlink electric signals addressed to respective optical network units 400 into optical signals and output the converted signals to the wavelength multiplex separation unit 222. Further, the optical transmission/reception unit 221-1 and the optical transmission/reception unit 221-2 receive downlink optical signals transmitted by respective optical network units 400 and convert them into electric signals. The optical transmission/reception unit 221-1 and the optical transmission/reception unit 222-2 use different wavelengths in communications. For example, the optical transmission/reception unit 221-1 uses wavelength $\lambda_{d1}$ for downlink optical signals and uses wavelength $\lambda_{u1}$ for uplink optical signals. The optical transmission/reception unit 221-2 uses wavelength $\lambda_{u2}$ for downlink optical signals and uses wavelength $\lambda_{u2}$ for uplink optical signals.

The wavelength multiplex separation unit 222 wavelength-multiplexes the downlink optical signal output by the optical transmission/reception unit 221-1 and the downlink optical signal output by the optical transmission/reception unit 221-2 and outputs it to the optical branch unit 223. Further, the wavelength multiplex separation unit 222 receives a multiplex signal multiplexing uplink optical signals from the optical branch unit 223, and wavelength-separates the multiplexed uplink optical signal. The wavelength multiplex separation unit 222 distributes and outputs the separated optical signals, according to wavelength, to the optical transmission/reception unit 221-1 and the optical transmission/reception unit 221-2.

The optical branch unit 223 branches the downlink multiplex signal input from the wavelength multiplex separation unit 222 and outputs two same downlink multiplex signals to the switch unit 224. Further, the optical branch unit 223 outputs an uplink multiplex signal output by the switch unit 224 to the wavelength multiplex separation unit 222.

The switch unit 224 outputs the downlink optical signal input from the optical branch unit 223 to the trunk line fiber 501-1 when it is determined that there is no fiber disconnection in the trunk line fiber 501, and to the trunk line fiber 501-1 and the lengthy fiber 502 when it is determined that there is a fiber disconnection in the trunk line fiber 501. The switch unit 224 outputs the uplink multiplex signal transmitted through the trunk line fiber 501-1 to the optical branch unit 223 when it is determined that there is no fiber disconnection in the trunk line fiber 501. The switch unit 224 outputs the uplink multiplex signal transmitted through the trunk line fiber 501-1 and the uplink multiplex signal transmitted through the lengthy fiber 502 to the optical branch unit 223 when it is determined that there is a fiber disconnection in the trunk line fiber 501.

Next, an operation of the optical communication system 120 when no communication interruption occurs in the trunk line fiber 501 will be described. When no communication interruption occurs, the switch unit 224 of the optical line terminal 220 disables input/output of any optical signal using the port connected to the lengthy fiber 502.

First, an operation of downlink communication when no communication interruption occurs will be described. In the optical line terminal 220, the optical transmission/reception unit 221-1 and the optical transmission/reception unit 221-2 convert downlink electric signals addressed to the optical network units 400 into optical signals and output the converted signals to the wavelength multiplex separation unit 222. Whether either the optical transmission/reception unit 221-1 or the optical transmission/reception unit 221-2 performs conversion from the electric signal into the optical signal is dependent on the wavelength used by the optical network unit 400 being the destination of the signal.

The wavelength multiplex separation unit 222 wavelength-multiplexes the downlink optical signal output by the optical transmission/reception unit 221-1 and the downlink optical signal output by the optical transmission/reception unit 221-2, and outputs the multiplex signal to the optical branch unit 223. The optical branch unit 223 branches the downlink multiplex signal input from the wavelength multiplex separation unit 222 into two same downlink multiplex signals and outputs them to the switch unit 224. The switch unit 224 outputs one downlink multiplex signal input from the optical branch unit 223 to the trunk line fiber 501-1 and discards the other multiplex signal. The following operation of the optical communication system 120 is similar to that of the optical communication system 100 of the second embodiment illustrated in FIG. 3.

Next, an operation of uplink communication when no communication interruption occurs will be described. Similar to the second embodiment, an uplink multiplex signal from each of the trunk line fiber 501-1 and the lengthy fiber 502 is input to the optical line terminal 220. This multiplex signal is a signal obtained by performing wavelength multiplexing and time division multiplexing on respective uplink optical signals transmitted by the optical network units 400-1 to 400-N that are different in wavelength. The switch unit 224 of the optical line terminal 220 receives the uplink multiplex signal from the trunk line fiber 501-1, and outputs it to the optical branch unit 223. The optical branch unit 223 outputs the uplink multiplex signal input from the switch unit 224 to the wavelength multiplex separation unit 222. The wavelength multiplex separation unit 222 wavelength-separates the input uplink multiplex signal and distributes and outputs the separated optical signals, according to the wavelength, to the optical transmission/reception unit 221-1 and the optical transmission/reception unit 221-2. As the wavelength multiplex separation unit 222, any passive component such as a simple optical filter that enables light of a predetermined wavelength to pass through without distribution operation may be used. The optical transmission/reception unit 221-1 and the optical transmission/reception unit 221-2 input the uplink optical signals transmitted by the optical network units 400 from the wavelength multiplex separation unit 222, and convert each optical signal into an electric signal.

Next, an operation of the optical communication system 120 at the time of communication interruption occurring in the trunk line fiber 501-$k$ will be described. At the time of communication interruption occurring, the switch unit 224 of the optical line terminal 220 enables input/output of any optical signal using the port connected to the lengthy fiber 502.

First, an operation of downlink communication at the time of communication interruption occurring will be described. In the optical line terminal 220, the optical transmission/reception unit 221-1, the optical transmission/reception unit 221-2, the wavelength multiplex separation unit 222, and the optical branch unit 223 operate in the same manner as when no communication interruption occurs. The switch unit 224 inputs, from the optical branch unit 223, two same multiplex signals multiplexing respective downlink optical signals addressed to the optical network units 400-1 to 400-N. The switch unit 224 outputs one input multiplex signal to the trunk line fiber 501-1 and the other multiplex signal to the lengthy fiber 502. The following operation of the optical communication system 120 is similar to that of the optical communication system 100 of the second embodiment illustrated in FIG. 3.

Next, an operation of uplink communication at the time of communication interruption occurring will be described. Similar to the second embodiment, the optical line terminal 220 inputs a multiplex signal multiplexing respective uplink optical signals from the optical network units 400-1 to 400-($k$–1) being their transmission sources from the trunk line fiber 501-1, and inputs a multiplex signal wavelength multiplexing and time division multiplexing respective uplink optical signals from the optical network units 400-$k$ to 400-N being their transmission sources from the lengthy fiber 502.

The switch unit 224 of the optical line terminal 220 outputs the multiplex signal received from the trunk line fiber 501-1 and the multiplex signal received from the lengthy fiber 502 to the optical branch unit 223. The optical branch unit 223 outputs the two uplink multiplex signals input from the switch unit 224 to the wavelength multiplex separation unit 222. The wavelength multiplex separation unit 222 wavelength-separates each of the two input uplink multiplex signals, and outputs respective separated optical signals, according to the wavelength, to the optical transmission/reception unit 221-1 or the optical transmission/reception unit 221-2. The optical transmission/reception unit 221-1 and the optical transmission/reception unit 221-2 input the uplink optical signals from the wavelength multiplex separation unit 222 and convert each optical signal into an electric signal.

Fifth Embodiment

In the fourth embodiment, when the trunk line fiber is cut, the optical line terminal transmits copied downlink optical signals addressed to the same optical network unit to both the trunk line fiber and the lengthy fiber. In the fifth embodiment, when the trunk line fiber is cut, the optical line terminal transmits, to the trunk line fiber, optical signals addressed to optical network units connected to any trunk line fiber adjacent to the optical line terminal than the cut point. Further, the optical line terminal transmits, to the lengthy fiber, optical signals addressed to optical network units connected to any trunk line fiber distant from the cut point. Hereinafter, differences between the fifth embodiment and the fourth embodiment will be mainly described.

Figure 7:
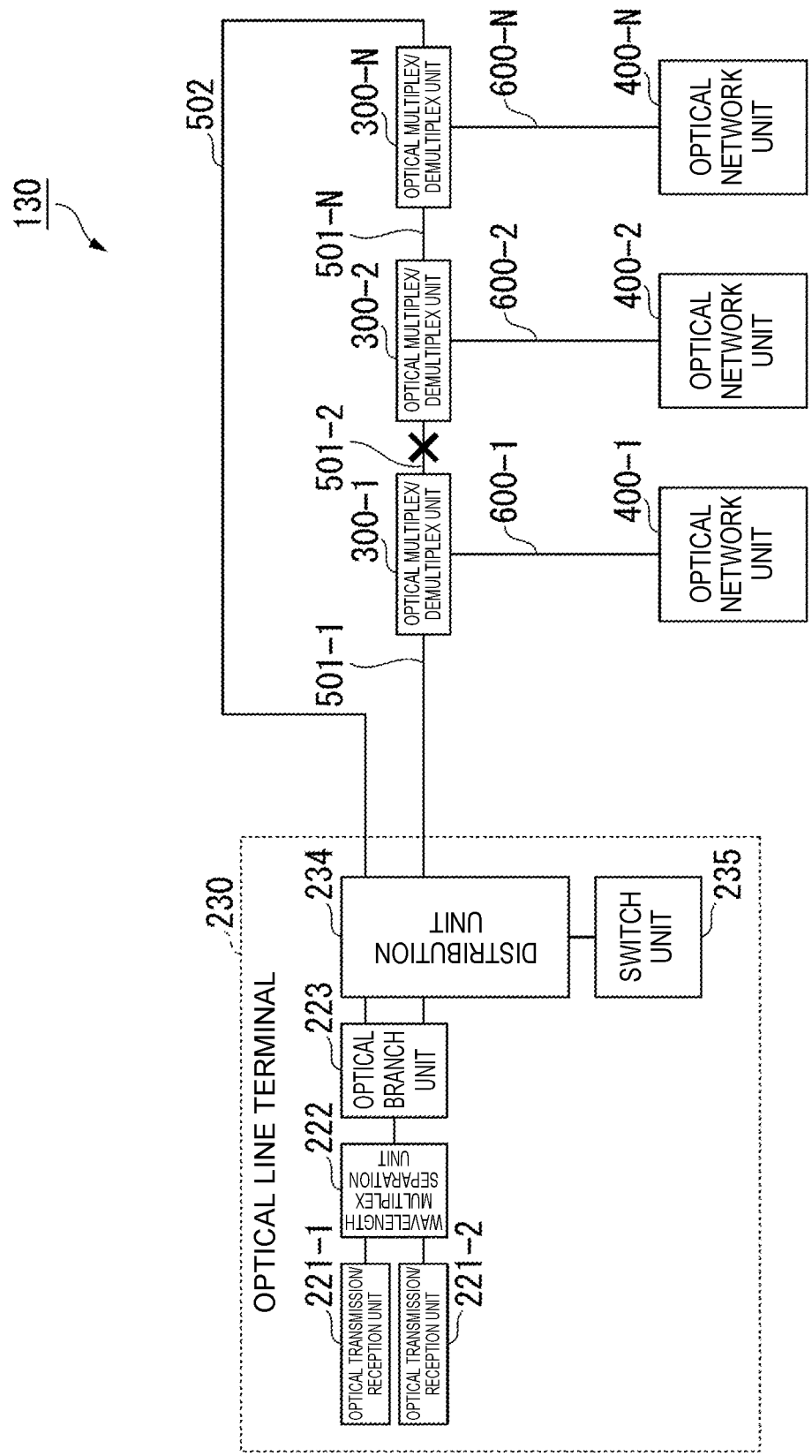
FIG. 7 is a diagram illustrating an exemplary configuration of an optical communication system according to a fifth embodiment.
Figure 8:
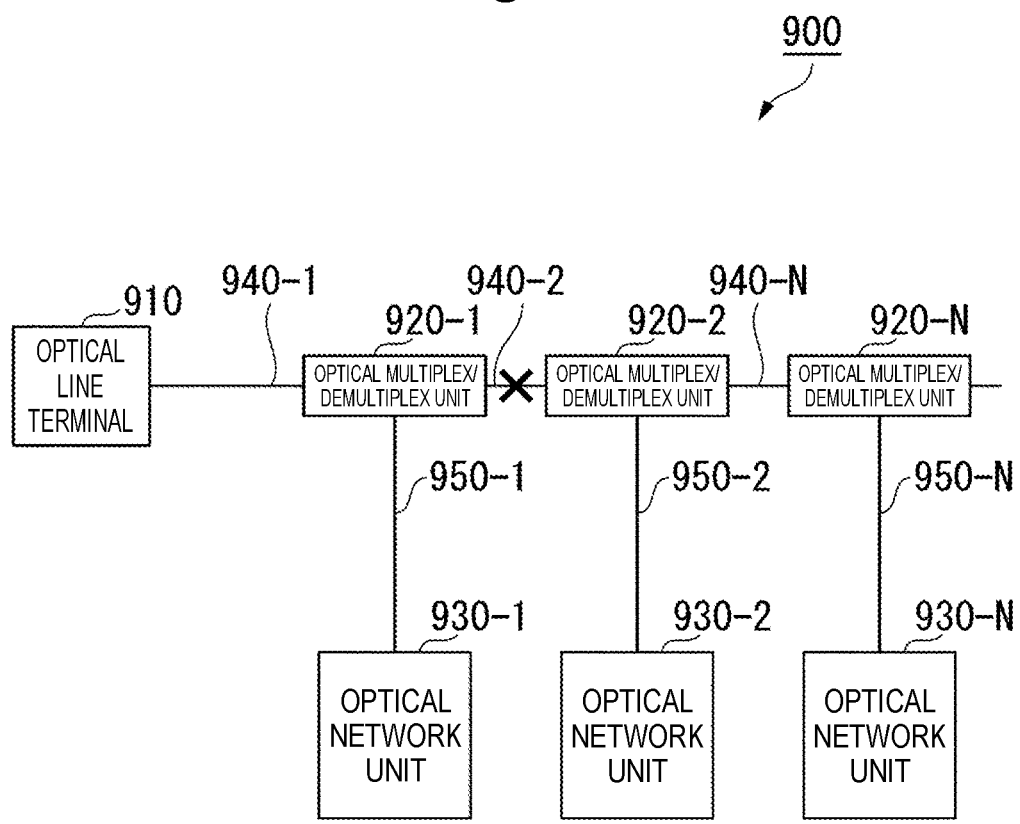
FIG. 8 is a diagram illustrating an exemplary configuration of an optical communication system according to a conventional technique.

FIG. 7 is a diagram illustrating a configuration of an optical communication system 130 according to the fifth embodiment. In this drawing, the same components as those of the optical communication system 120 of the fourth embodiment illustrated in FIG. 6 are denoted by the same reference numerals and descriptions thereof will be omitted. The optical communication system 130 is different from the optical communication system 120 of the fourth embodiment in that the optical line terminal 220 is replaced by an optical line terminal 230.

The optical line terminal 230 is different from the optical line terminal 220 illustrated in FIG. 6 in that the switch unit 224 is replaced by a distribution unit 234 and a switch unit 235.

According to an instruction of the switch unit 235, the distribution unit 234 performs processing for outputting one of downlink multiplex signals branched by the optical branch unit 223 to the trunk line fiber 501-1, or performs processing for distributing and transmitting downlink optical signals included in the multiplex signal to the trunk line fiber 501-1 or the lengthy fiber 502, depending on the destination. Further, according to an instruction of the switch unit 235, the distribution unit 234 performs processing for outputting the uplink multiplex signal received from the trunk line fiber 501-1 to the optical branch unit 223, or performs processing for outputting the uplink multiplex signal received from the trunk line fiber 501-1 and the uplink multiplex signal received from the lengthy fiber 502 to the optical branch unit 223.

When it is determined that there is no fiber disconnection, the switch unit 235 instructs the distribution unit 234 to output a downlink multiplex signal to the trunk line fiber 501-1 and receive an uplink multiplex signal from the trunk line fiber 501-1. When it is determined that there is a fiber disconnection, the switch unit 235 instructs the distribution unit 234 to output a multiplex signal multiplexing downlink optical signals addressed to optical network units 400 connected to the trunk line fiber 501 adjacent to the optical line terminal 230 than the cut point to the trunk line fiber 501-1, and output a multiplex signal multiplexing downlink optical signals addressed to optical network units 400 connected to the trunk line fiber 501 distant from the cut point to the lengthy fiber 502. Further, when it is determined that there is a fiber disconnection, the switch unit 235 instructs the distribution unit 234 to receive uplink multiplex signals from the trunk line fiber 501-1 and the lengthy fiber 502.

Next, an operation of the optical communication system 130 when no communication interruption occurs in the trunk line fiber 501 will be described. When no communication interruption occurs, the switch unit 235 of the optical line terminal 220 instructs the distribution unit 234 to stop using the port connected to the lengthy fiber 502.

First, an operation of downlink communication when no communication interruption occurs will be described. When no communication interruption occurs in the trunk line fiber 501, operations of the optical transmission/reception unit 221-1, the optical transmission/reception unit 221-2, the wavelength multiplex separation unit 222, and the optical branch unit 223 of the optical line terminal 230 are similar to the operations of the optical transmission/reception unit 221-1, the optical transmission/reception unit 221-2, the wavelength multiplex separation unit 222, and the optical branch unit 223 of the optical line terminal 220 of the fourth embodiment. The distribution unit 234 outputs one downlink multiplex signal input from the optical branch unit 223 to the trunk line fiber 501-1 and discards the other multiplex signal. The following operation of the optical communication system 130 is similar to that of the optical communication system 100 of the second embodiment.

Next, an operation of uplink communication when no communication interruption occurs will be described. Similar to the second embodiment, an uplink multiplex signal from each of the trunk line fiber 501-1 and the lengthy fiber 502 is input to the optical line terminal 230. The distribution unit 234 of the optical line terminal 230 receives the uplink multiplex signal from the trunk line fiber 501-1 and outputs it to the optical branch unit 223. The following operation of the optical communication system 130 is similar to that of the optical communication system 120 of the fourth embodiment.

Next, an operation of the optical communication system 130 at the time of communication interruption occurring in the trunk line fiber 501-$k$ will be described. When the occurrence of communication interruption in the trunk line fiber 501-$k$ is detected, the switch unit 235 of the optical line terminal 230 instructs the distribution unit 234 to use the port to the trunk line fiber 501-1 and the port to the lengthy fiber 502. In addition, the switch unit 235 instructs the distribution unit 234 to transmit an optical signal addressed to the optical multiplex/demultiplex unit 300-$i_1$ ($i_1$ is not less than 1 and not greater than $k-1$) to the trunk line fiber 501-1, and transmit a signal addressed to the optical multiplex/demultiplex unit 300-$i_2$ ($i_2$ is not less than k and not greater than N) to the lengthy fiber 502.

First, downlink communication at the time of communication interruption occurring will be described. In the optical line terminal 230, the optical transmission/reception unit 221-1, the optical transmission/reception unit 221-2, the wavelength multiplex separation unit 222, and the optical branch unit 223 operate in the same manner as when no communication interruption occurs. The distribution unit 234 separates a multiplex signal multiplexing downlink optical signals addressed to the optical network units 400-1 to 400-($k-1$) from one downlink multiplex signal received from the optical branch unit 223 and outputs it to the trunk line fiber 501-1. In addition, the distribution unit 234 separates a multiplex signal multiplexing downlink optical signals addressed to the optical network units 400-$k$ to 400-N from the other downlink multiplex signal received from the optical branch unit 223 and outputs it to the lengthy fiber 502. The following operation of the optical communication system 130 is similar to that of the optical communication system 110 of the second embodiment.

Further, the operation of uplink communication of the optical communication system 130 at the time of occurrence of communication interruption is the same as that of the fourth embodiment. However, the distribution unit 234 of the optical line terminal 230 outputs the multiplex signal received from the trunk line fiber 501-1 and the multiplex signal received from the lengthy fiber 502 to the optical branch unit 223. Respective uplink optical signals from the optical network units 400-1 to 400-($k-1$) being their transmission sources are multiplexed in the multiplex signal received from the trunk line fiber 501-1. Respective uplink optical signals from the optical network units 400-$k$ to 400-N being their transmission sources are multiplexed in the multiplex signal received from the lengthy fiber 502. The following operation is similar to that of the optical line terminal 220 of the fourth embodiment.

As mentioned above, when there is no fiber cut in the trunk line fiber, the optical line terminal outputs downlink signals to only the trunk line fiber. If the trunk line fiber is cut, the optical line terminal detects the occurrence of link break from a plurality of optical network units without a dying gasp which is output at the time of power interruption. When determining the occurrence of fiber cut in the trunk line fiber, the optical line terminal inputs the downlink signal to the lengthy fiber, too. Optical network units located adjacently than the cut point on the path, when seen from the trunk line fiber connected to the optical line terminal, performs optical communications via the trunk line fiber. On the other hand, optical network units located distantly from the cut point on the path, when seen from the trunk line fiber connected to the optical line terminal, performs optical communications via the lengthy fiber.

When no signal is received for a predetermined period, linking-down may occur depending on the optical communication system. However, it transitions to a communicable state when the optical communication system performs relinking-up processing. Further, in the case of TDMA (Time Division Multiple Access), linking-down may occur due to a time lag or the like held by each optical network unit and the optical line terminal. However, even in the case of TDMA, when Ranging processing is performed between the optical network unit and the optical line terminal at the time of relinking-up, the propagation time depending on the distance between the optical network unit and optical line terminal can be remeasured, and subsequently communications can be performed without any problem.

According to the above-described embodiments, even when the trunk line fiber is cut, communications between the optical line terminal and the optical network unit can be maintained.

According to the above-described embodiments, in the optical communication system, an optical communication device and a plurality of optical transmission devices are loop-connected via transmission line. An optical signal transmission unit of the optical communication device, when no communication interruption occurs in the transmission line, outputs an optical signal addressed to a communication destination device being another optical communication device that communicates with the own device to a transmission line connected to either one optical transmission device of two neighboring optical transmission devices. Further, the optical signal transmission unit outputs, at the time of communication interruption occurring in the transmission line, an optical signal addressed to the communication destination device to both of transmission lines connected to respective two neighboring optical transmission devices. A branch unit of the optical transmission device branches the optical signal input from a neighboring device that is a neighboring optical communication device or another optical transmission device, and outputs branched optical signals to both of a transmission line connected to a neighboring device different from the neighboring device transmitted the optical signal and a transmission line connected to a subordinate communication destination device of the own device.

The optical signal transmission unit may output, at the time of communication interruption occurring in the transmission line, the optical signal addressed to the same communication destination device to both of transmission lines connected to respective two neighboring optical transmission devices. Further, the optical signal transmission unit may output, at the time of communication interruption occurring in the transmission line, the optical signal to either one of transmission lines connected to respective two neighboring optical transmission devices depending on the communication destination device being the destination. Further, the optical signal transmission unit may multiplex a plurality of optical signals addressed to different communication destination devices and output a multiplexed signal to the transmission line.

Further, the branch unit branches an optical signal input from a subordinate communication destination device and outputs the branched signals to both transmission lines connected to respective two neighboring devices. An optical signal reception unit of the optical communication device receives respective signals transmitted by a plurality of communication destination devices, when no communication interruption occurs in the transmission line, from either one optical transmission device of the two neighboring optical transmission devices. Further, the optical signal reception unit of the optical communication device receives respective signals transmitted by the plurality of communication destination devices, at the time of communication interruption occurring in the transmission line, from either one of the two neighboring optical transmission devices depending on the communication destination device. That is, the optical signal reception unit receives, from a first neighboring device being one neighboring device, the signal transmitted by the communication destination device between the first neighboring device and the cut point. Further, the optical signal reception unit receives, from a second neighboring device being another neighboring device, the signal transmitted by the communication destination device between the second neighboring device and the cut point.

Although the embodiments of the present invention have been described in detail with reference to the drawings, specific configurations are not limited to those embodiments and encompass designs and the like within the gist of the present invention.

REFERENCE SIGNS LIST 1, 1a, 100, 110, 120, 130, 900 Optical communication system
2 Primary optical communication device
3, 3-1 to 3-N Optical transmission device
4-1 to 4-N Secondary optical communication device
5-1 to 5-(N+1), 6-1 to 6-N, 8-1, 8-N, 9-1, 9-N Transmission line
7-1, 7-N Secondary optical transmission device
21 Optical signal transmission unit
22 Optical signal reception unit
31 Branch unit
200, 210, 220, 230, 910 Optical line terminal
201 Interface unit
202 Copy multiplex unit
203, 213, 224, 235 Switch unit
204-1-1, 204-1-2, 204-2-1, 204-2-2, 221-1, 221-2 Optical transmission/reception unit
205-1, 205-2, 401 Optical multiplex separation unit
212, 234 Distribution unit
222 Wavelength multiplex separation unit
223 Optical branch unit
300-1 to 300-N, 920-1 to 920-N Optical multiplex/demultiplex unit
301, 302, 303 dB coupler
400-1 to 400-N, 930-1 to 930-N Optical network unit
402 Optical transmission/reception unit
501-1 to 501-N, 940-1 to 940-N Trunk line fiber
600-1 to 600-N, 950-1 to 950-N Branch line fiber

The invention claimed is:
1. An optical communication system in which an optical communication device and a plurality of optical transmission devices are loop-connected via a transmission line, wherein
the optical communication device includes:
an optical signal transmission unit configured to output, when no communication interruption occurs in the transmission line, an optical signal addressed to a communication destination device being another optical communication device that communicates with an own device to the transmission line connected to either one optical transmission device of two neighboring optical transmission devices, and output, at the time of communication interruption occurring in the transmission line, the optical signal addressed to the communication destination device to both of transmission lines connected to respective two neighboring optical transmission devices, and
the optical transmission device includes a branch unit configured to branch an optical signal input from a neighboring device that is a neighboring optical communication device or another optical transmission device, and output branched optical signals to both of the transmission line connected to a neighboring device different from the neighboring device that transmitted the optical signal and a transmission line connected to a subordinate communication destination device of the own device, wherein the branch unit is configured to branch an optical signal input from a subordinate communication destination device and output the branched signals to both of transmission lines connected to respective two neighboring devices, and wherein the optical communication device further includes an optical signal reception unit configured to receive respective signals transmitted by a plurality of communication destination devices, when no communication interruption occurs in the transmission line, from either one optical transmission device of the two neighboring optical transmission devices, and receive respective signals transmitted by the plurality of communication destination devices, at the time of communication interruption occurring in the transmission line, from either one of the two neighboring optical transmission devices depending on the communication destination device.

2. The optical communication system according to claim 1, wherein the optical signal transmission unit is configured to output, at the time of communication interruption occurring in the transmission line, the optical signal addressed to the same communication destination device to both of transmission lines connected to respective two neighboring optical transmission devices.

3. The optical communication system according to claim 2, wherein the optical signal transmission unit is configured to multiplex a plurality of optical signals addressed to different communication destination devices and output a multiplexed signal to the transmission line.

4. The optical communication system according to claim 1, wherein the optical signal transmission unit is configured to output, at the time of communication interruption occurring in the transmission line, the optical signal to either one of the transmission lines connected to respective two neighboring optical transmission devices depending on the communication destination device being a destination.

5. The optical communication system according to claim 4, wherein the optical signal transmission unit is configured to multiplex a plurality of optical signals addressed to different communication destination devices and output a multiplexed signal to the transmission line.

6. The optical communication system according to claim 1, wherein the optical signal transmission unit is configured to multiplex a plurality of optical signals addressed to different communication destination devices and output a multiplexed signal to the transmission line.

7. An optical communication device that is an optical communication device in an optical communication system in which the optical communication device and a plurality of optical transmission devices are loop-connected via a transmission line, wherein:

the optical communication device includes an optical signal transmission unit configured to output, when no communication interruption occurs in the transmission line, an optical signal addressed to a communication destination device being another optical communication device that communicates with an own device to the transmission line connected to either one optical transmission device of two neighboring optical transmission devices, and output, at the time of communication interruption occurring in the transmission line, an optical signal addressed to the communication destination device to both of transmission lines connected to respective two neighboring optical transmission devices, wherein the optical transmission device includes a branch unit configured to branch an optical signal input from a subordinate communication destination device and output the branched signals to both of transmission lines connected to respective two neighboring devices, and wherein the optical communication device further includes an optical signal reception unit configured to receive respective signals transmitted by a plurality of communication destination devices, when no communication interruption occurs in the transmission line, from either one optical transmission device of the two neighboring optical transmission devices, and receive respective signals transmitted by the plurality of communication destination devices, at the time of communication interruption occurring in the transmission line, from either one of the two neighboring optical transmission devices depending on the communication destination device.

8. An optical communication method for an optical communication device in an optical communication system in which the optical communication device and a plurality of optical transmission devices are loop-connected via a transmission line, comprising:

outputting, when no communication interruption occurs in the transmission line, an optical signal addressed to a communication destination device being another optical communication device that communicates with an own device to the transmission line connected to either one optical transmission device of two neighboring optical transmission devices, and outputting, at the time of communication interruption occurring in the transmission line, an optical signal addressed to the communication destination device to both of transmission lines connected to respective two neighboring optical transmission devices, wherein the optical transmission device includes a branch unit configured to branch an optical signal input from a subordinate communication destination device and output the branched signals to both of transmission lines connected to respective two neighboring devices, and wherein the the optical communication device further includes an optical signal reception unit configured to receive respective signals transmitted by a plurality of communication destination devices, when no communication interruption occurs in the transmission line, from either one optical transmission device of the two neighboring optical transmission devices, and receive respective signals transmitted by the plurality of communication destination devices, at the time of communication interruption occurring in the transmission line, from either one of the two neighboring optical transmission devices depending on the communication destination device.

* * * * *